(12) United States Patent  
Graves et al.

(10) Patent No.: US 6,704,307 B1
(45) Date of Patent: Mar. 9, 2004

(54) COMPACT HIGH-CAPACITY SWITCH

(75) Inventors: Alan F. Graves, Kanata (CA); Nigel L. Bragg, Cambridge (GB)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/517,432

(22) Filed: Mar. 2, 2000

(30) Foreign Application Priority Data

Sep. 27, 1999 (CA) ............................................. 2283953

(51) Int. Cl.[7] .............................................. H04Q 11/04
(52) U.S. Cl. ....................................... 370/372; 370/388
(58) Field of Search ................................. 370/388, 372, 370/369

(56) References Cited

U.S. PATENT DOCUMENTS

| | | | | |
|---|---|---|---|---|
| 4,450,557 A | | 5/1984 | Munter | 370/58 |
| 4,470,139 A | | 9/1984 | Munter | 370/66 |
| 4,804,956 A | * | 2/1989 | Boxall | 340/2.21 |
| 5,504,739 A | * | 4/1996 | Chopping | 370/372 |
| 5,528,406 A | | 6/1996 | Jeffrey et al. | |
| 5,671,304 A | | 9/1997 | Duguay | 385/17 |
| 5,745,486 A | | 4/1998 | Beshai et al. | |
| 5,875,190 A | | 2/1999 | Law | 370/395 |

FOREIGN PATENT DOCUMENTS

| | | |
|---|---|---|
| EP | 0 558 291 A2 | 9/1993 |
| GB | 2 074 815 A | 11/1981 |

OTHER PUBLICATIONS

Matthew S. Goodman, Haim Kobrinski, Mario P. Vecchi, Ray M. Bulley and James L. Gimlett; The Lambdanet Multiwavelength Network: Architecture, Applications, and Demonstrations; IEEE Journal on Selected Areas in Communications, vol. 8, No. 6; Aug 1990; pps. 995–1004.

Charles A. Brackett; Dense Wavelength Division Mulitplexing Networks: Principles and Application; IEEE Journal on Selected Areas in Communications, vol. 8, No. 6; Aug. 1990; pps. 948–964.

Zhensheng Zhang and Anthony S. Acampora; Performance Analysis of Multihop Lightwave Networks with Hot Potato Routing and Distance–Age–Priorities; IEEE Transactions on Communications, vol. 42, No.8; Aug. 1994; pps. 2571–2581.

Anthony S. Acampora, Mark J. Karol, and Michael G. Hluchyj; Terabit Lightwave Networks: The Multihop Approach; Nov./Dec. 1987; AT&T Technical Journal, vol. 66, Issue 6; pps. 21–34.

Donald K. Wilson; A New Architecture For Packaging Wideband Communications Equipment Using a 3–D, Orthogonal Edge–to–Edge Topology; Source Unknown; 1988; pps. 0430–0434.

Bharat T. Doshi, Subra Dravida, Enrique Hernandez–Valencia, Jon Anderson, and James Manchester; Multi–Protocol Over a Bytestream (MOB): A New Protcol Stack For Supporting Heterogeneous Traffic Over a Common Link; Source Unknown; pps. 1–6.

\* cited by examiner

Primary Examiner—Min Jung

(57) ABSTRACT

A switching unit, equipped with a plurality of port cards and a plurality of switch cards connected in a non-parallel fashion to the port cards. Each port card has a first M-way commutator and a second M-way commutator, wherein the total number of first M-way commutators over all the port cards is N and wherein the total number of second M-way commutators over all the port cards is also N. Each switch card has a first N-way commutator and a second N-way commutator, wherein the total number of first N-way commutators over all the switch cards is M and wherein the total number of second N-way commutators over all the switch cards is also M. Each switch card further has a unit for controllably time switching a plurality of signals output by each first N-way commutator and providing a plurality of switched signals to the corresponding second N-way commutator. The mth output of the nth first M-way commutator is connected to the nth input of the mth first N-way commutator and the nth output of the mth second N-way commutator is connected to the mth input of the nth second M-way commutator, for $1<=m<=M$ and $1<=n<=N$. The commutators and the time switching units cooperate to provide non-blocking time and space switching of signals at the inputs of the first M-way commutators.

44 Claims, 17 Drawing Sheets

● = FORWARD FACING PIN

○ = REAR FACING PIN

FIG. 6

COMPACT HIGH-CAPACITY SWITCH

FIELD OF THE INVENTION

The present invention relates to digital switching technology in general and, more particularly, to a compact, very high-capacity switch for use in an optical transport network.

BACKGROUND OF THE INVENTION

The ever-increasing popularity of the Internet as a vehicle for transmitting information of all sorts, including electronic mail messages, voice conversations, photographs, data files and live broadcasts, has led to an explosion in the volume of digital traffic travelling on today's backbone of mainly low-capacity (e.g., OC-3 and OC-48) links. The expression "OC-x" is used to denote "optical carrier" and refers to a digital optical signal having a rate of "x" times the basic rate of 51.84 Mbps, where "x" can typically take on the values 3, 12, 48 or 192. Thus, for example, an OC-48 signal has a rate of 2.488 Gbps, which is approximately equal to 2.5 Gbps or 2.5 billion bits per second.

The demand for greater network capacity brought on largely by the advent of the information age has led to the introduction of OC-192 links as well as a technology known as WDM or wavelength division multiplexing. In WDM, multiple individual optical carriers—be they OC-3 signals, OC-48 signals, OC-192 signals or any other type of signal—each occupy distinct wavelengths of light along a span of fiber optic cable. As multiple wavelengths are independently occupied by various signals, the amount of information carried by a single optical fiber can be dramatically increased with respect to the usual case in which only a single wavelength of light is used.

It is anticipated that future transport capabilities will be on the order of several terabits per second (Tbps, equal to $10^{12}$ bits per second) per fiber. At the transport level, this will likely be accommodated through the use of WDM with 100 or more wavelengths on a single fiber, and with each wavelength carrying an OC-192 feed (i.e., a digital optical signal at approximately 10 Gbps). If a large number of such multi-wavelength fibers pass through a network node, the switching equipment at the node will be required to support capacities in the multi-terabit-per-second range in order to provide sufficient switching granularity for interconnecting wavelengths from each span in a non-blocking manner. However, conventionally available technology does not allow such extremely high switching capacities to be achieved.

That is to say, while there has been a rapid evolution of WDM-enabled transport technology to the point where currently used techniques are expected to adequately support future transport requirements, the field of switching technology has not experienced improvements of a similar magnitude. As a result, the telecommunications industry currently lacks access to switches capable of cross-connecting several hundred or several thousand multi-gigabit-per-second feeds in accordance with an arbitrary mapping in a non-blocking way to achieve switching capacities in the multi-terabit-per-second range.

In the quest for extremely high switching capacity, current telecommunications service providers may suggest extending the very concepts which have brought switching technology to its present state. However, such concepts, which include time-division multiplexing, time switching and space switching, are not easily adapted to handle the switching of multiple signals contemporaneously sharing the same transmission medium (as is generally the case in a WDM scenario). Furthermore, a straightforward extension of currently used switching techniques into the terabit-per-second range leads to central office equipment having an unacceptably high power consumption largely as a result of a grossly impractical physical volume.

Thus, when faced with a need to switch multiple terabits of digital information per second inside a reasonable volume and within reasonable limits of power consumption, it is apparent that reliance cannot be placed upon conventionally available switching technology.

SUMMARY OF THE INVENTION

The present invention provides a solution to the above-mentioned problems inherent to currently used switching technologies, by providing a high-capacity switch, capable of operation in at least the multi-Tbps range, that is sufficiently compact to fit into a single equipment shelf.

According to the invention, the implementational difficulties associated with constructing large commutative switches are alleviated by distributing the functionality of various elements of a large conceptual commutative switch among multiple circuit cards.

Thus, the invention may be summarized as a switching unit, equipped with a plurality of port cards and a plurality of switch cards. Each port card has at least one first M-way commutator and a corresponding number of second M-way commutators, wherein the total number of first M-way commutators over all the port cards is N and wherein the total number of second M-way commutators over all the port cards is also N. Each switch card has at least one first N-way commutator and a corresponding number of second N-way commutators, wherein the total number of first N-way commutators over all the switch cards is M and wherein the total number of second N-way commutators over all the switch cards is also M.

Each switch card further has a unit for controllably time switching a plurality of signals output by each first N-way commutator and providing a plurality of switched signals to the corresponding second N-way commutator. The mth output of the nth first M-way commutator is connected to the nth input of the mth first N-way commutator and wherein the nth output of the mth second N-way commutator is connected to the mth input of the nth second M-way commutator, for $1<=m<=M$ and $1<=n<=N$.

Preferably, the N-way commutators and the N-way commutators have harmonically related commutation step rates, whereby the first N-way commutators on the port cards and the first N-way commutators on the switch cards work as a P-way commutator and whereby the second N-way commutators on the port cards and the second N-way commutators on the switch cards work as a P-way commutator, where $P=M*N$.

Preferably, the port cards are substantially parallel to one another, wherein the switch cards are substantially parallel to one another and wherein the normal to any port card and the normal to any switch card are not parallel.

Preferably, the port cards are substantially parallel to one another, wherein the switch cards are substantially parallel to one another and wherein the port cards are substantially orthogonal to the switch cards.

Preferably, the switching unit is further equipped with a mid-plane connected to the port cards and to the switch cards, wherein the connections between the first M-way commutators and the first N-way commutators and the connections between the second N-way commutators and the second M-way commutators are provided by electrical paths through the mid-plane.

Preferably, the commutators and the time switching units cooperate to provide non-blocking time and space switching of signals at the inputs of the first M-way commutators.

The invention may also be summarized as a port card or a switch card as described above.

The invention may also be summarized as a compound commutator equipped with a plurality N of first commutators distributed among a plurality of substantially parallel first circuit cards, each first commutator having M inputs, M outputs and a common first commutation step rate, and a plurality M of second commutators distributed among a plurality of substantially parallel second circuit cards, each second commutator having N inputs, N outputs and a common second commutation step rate. The mth output of the nth first commutator is connected to the nth input of the mth second commutator for all $1<=m<=M$ and $1<=n<=N$. The first and second commutation step rates are harmonically related and the normal to any first circuit card and the normal to any second circuit card are not parallel.

BRIEF DESCRIPTION OF THE DRAWINGS

These and other aspects and features of the present invention will become apparent to those of ordinary skill in the art upon review of the following description of specific embodiments of the invention in conjunction with the accompanying drawings, in which:

FIG. 6 shows an input/output diagram of a 4×4 commutator;

DETAILED DESCRIPTION OF THE PREFERRED EMBODIMENT

Before the present invention is described in any detail, it is useful to introduce the concept of a commutator and that of a commutative switch, which are used extensively throughout the remainder of the detailed description. An M×M (or "M-way") commutator is an M-input, M-output circuit that transfers the data arriving on each of its M inputs over to each one of its M outputs for $1/M^{th}$ of the time in a repetitive cyclical manner.

Figure 9:
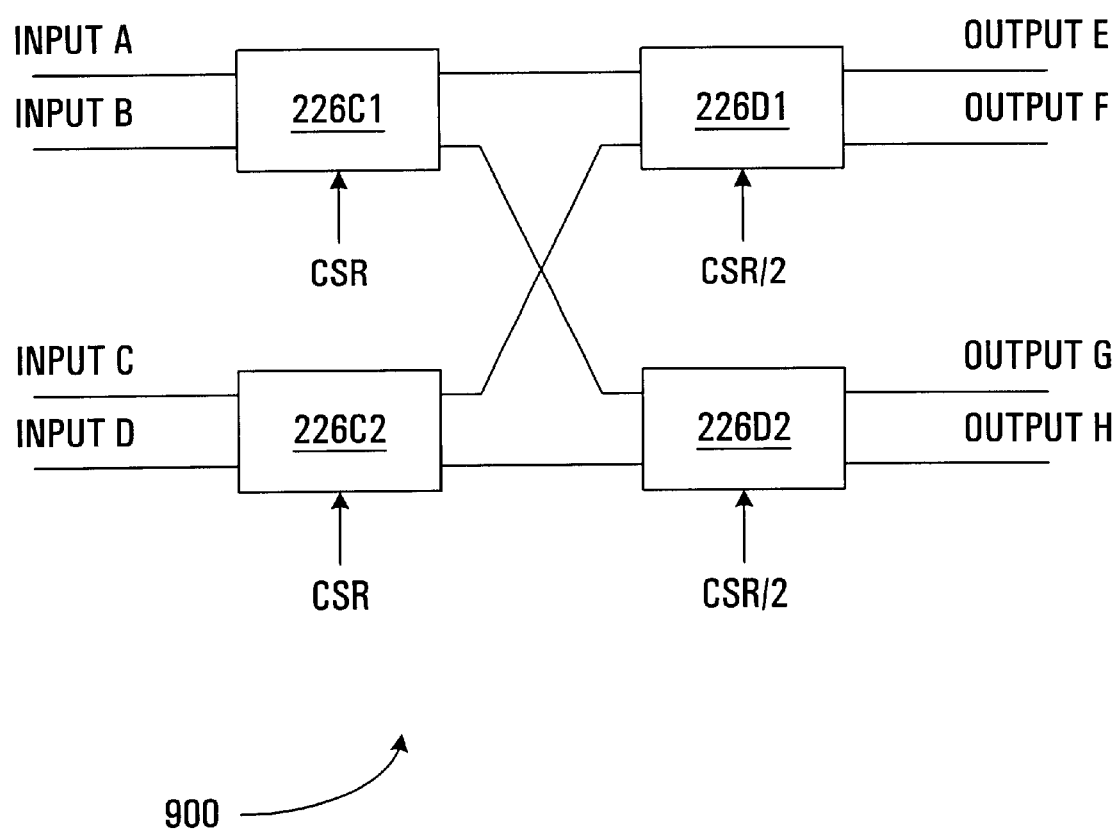
FIG. 9 is a block diagram of a 4×4 commutator.

With reference to FIG. 9, there is shown in more detail one possible way in which a four-input, four-output commutator 900 can be built. Similar concepts will apply to building a larger commutator. In the case of 4×4 commutator 900, four inputs A, B, C, D lead to two 2×2 switches 226C1, 226C2 and four outputs E, F, G, H are taken from another pair of 2×2 switches 226D1, 226D2. One output of switch 226C1 is connected to one input of switch 226D1, the other output of switch 226C1 is connected to one input of switch 226D2, one output of switch 226C2 is connected to the other input of switch 226D1 and the other output of switch 226C2 is connected to the other input of switch 226D2.

Each individual switch is programmed to toggle between a straight-through mapping and a cross-over mapping at evenly spaced time intervals. The rate of toggling an individual switch depends on the position of the switch in the commutator. Specifically, switches 226C1, 226C2 are caused to toggle (step) at a rate known as the commutation step rate (CSR), while switches 226D1, 226D2 are caused to toggle at half this rate. As a result, the exact same switching cycle repeats every four steps. The frequency at which the entire cycle repeats itself is known as the commutation cycle rate (QCR) and, in this case, is equal to CSR/4.

Figure 6:
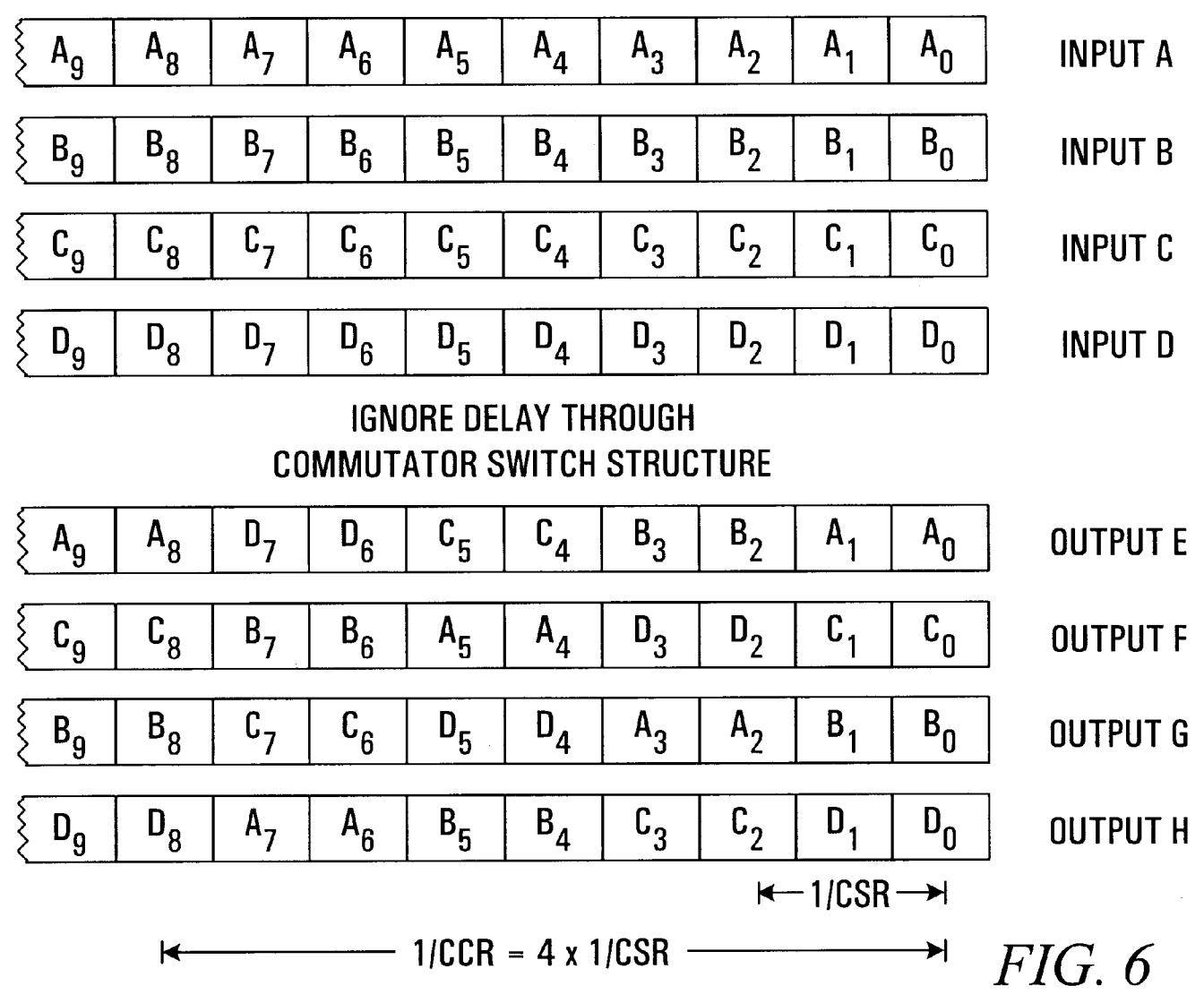

Operation of the commutator 900 is now described with reference to FIG. 6, where data elements present at each of the four inputs A, B, C, D is shown as being indexed by a time subscript which begins at 0 seconds (on the far right) and increases towards the left on a per-second basis. It is assumed for the purposes of illustration that a new data element arrives every second and that switches 226C1 and, 226C2 are toggled every two seconds (i.e., the commutator 900 has a CSR of ½ seconds$^{-1}$). This leads to a cycle time of 4*2=8 seconds. Also, it is assumed that the data collected at the outputs E, F, G, H suffers no delay as it passes through the commutator 900.

During the first two seconds, outputs E, F, G and H contain data from inputs A, C, B and D, respectively. After 2 seconds, switches 226C1 and 226C2 toggle and outputs E, F, G and H are respectively connected to inputs B, D, A and C. This is the state of affairs for the next two seconds, at which point switches 226C1 and 226C2 switch back to their initial mappings. In addition, at this point half-way through the cycle, switches 226D1 and 226D2 toggle their respective mappings. Thus, during the next two seconds, the data at outputs E, F, G and H comes from inputs C, A, D and B, respectively. Two seconds later, switches 226C1 and 226C2 are again toggled, and outputs E, F, G and H contain data from inputs D, B, C and A, respectively. This mapping remains in place until 8 seconds have gone by, at which point the entire cycle is repeated.

Thus, it is seen that the effect of the commutator 900 is to distribute data from each of the 4 inputs among the 4 outputs during one-quarter of the time. The order in which the inputs A, B, C, D appear on the outputs E, F, G, H can be changed by changing the toggling rate associated with the various switches. Those skilled in the art will appreciate that the original input data streams A, B, C, D can be recovered by passing the commutated output data streams E, F, G, H through an identical commutator running at the same CSR and CCR, except where the outputs of the second commutator are used as inputs and vice versa.

Figure 3:
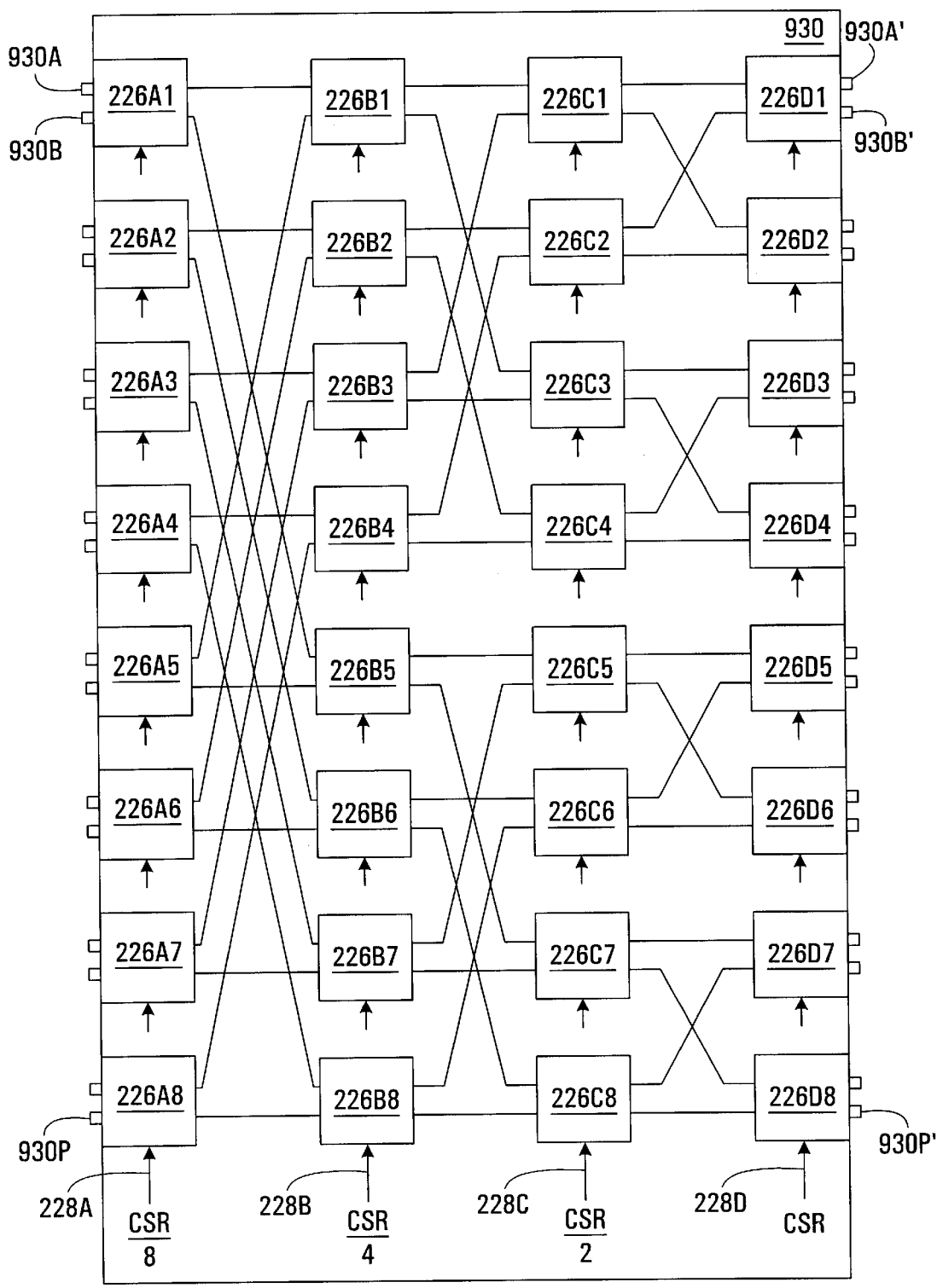
FIG. 3 is a block diagram of a 16×16 commutator.

Reference is now made to FIG. 3, which shows in more detail one possible way in which a sixteen-input, sixteen-output commutator 930 can be implemented. Of course, there are many other ways of building a commutator. The sixteen input ports 930A–930P correspond in actuality to a totality of input ports belonging to a first set of eight two-by-two switches 226A1-8, while the sixteen output ports 930A', 930B'–930P' correspond in actuality to a totality of output ports belonging to a fourth set of eight two-by-two switches 226D1-8. Between the first and fourth sets of switches lie second and third sets of eight two-by-two switches, respectively shown at 226B1-8 and 226C1-8 in FIG. 3.

The four sets of eight two-by-two switches 226A1-8, 226B1-8, 226C1-8, 226D1-8 are interconnected as follows. The outputs of switch 226A1 are connected to the inputs of switches 226B1 and 226B5, the outputs of switch 226A2 are connected to the inputs of switches 226B2 and 226B6, the outputs of switch 226A3 are connected to the inputs of switches 226B3 and 226B7 and the outputs of switch 226A4 are connected to the inputs of switches 226B4 and 226B8. Switches 226A5 through 226A8 are connected to switches 226B1 through 226B8 in a similar fashion.

Next, the outputs of switch 226B1 are connected to the inputs of switches 226C1 and 226C3, the outputs of switch 226B2 are connected to the inputs of switches 226C2 and 226C4, the outputs of switch 226B3 are connected to the inputs of switches 226C3 and 226C1 and the outputs of switch 226B4 are connected to the inputs of switches 226C4 and 226C2. An identical connection pattern exists among switches 226B5 through 226B8 and switches 226C5 through 226C8.

Finally, one output of switch 226C1 is connected to one input of switch 226D1, the other output of switch 226C1 is connected to one input of switch 226D2, one output of switch 226C2 is connected to the other input of switch 226D1 and the other output of switch 226C2 is connected to the other input of switch 226D2. An identical connection pattern exists between pairs of switches 226C3, 226C4 and 226D3, 226D4, between pairs of switches 226C5, 226C6 and 226D5, 226D6 and between pairs of switches 226C7, 226C8 and 226D7, 226D8.

Each individual switch is programmed to toggle between a straight-through mapping and a cross-over mapping at evenly spaced time intervals. A command to toggle each switch is received from a common control unit (not shown) via control lines 228A, 228B, 228C, 228D. The rate of toggling an individual switch depends on the set to which the switch belongs. Specifically, switches 226D1-8 in the fourth set are programmed to switch at a rate known as the commutation step rate (CSR). Switches in the third, second and first sets are programmed to switch at rates of CSR/2, CSR/4 and CSR/8, respectively. As a result, the exact same switching cycle repeats at intervals that are 16 times as long as the interval of a single step. The frequency at which the entire cycle repeats itself, known as the commutation cycle rate (CCR), is equal to CSR/16 or one-sixteenth of the commutation step rate.

Without going into more detail, it will be appreciated that the effect of the commutator 930 is to distribute data from each of the 16 inputs 930A–930P among the 16 outputs 930A'–930P' during one-sixteenth of the time. Those skilled in the art will also appreciate that the original input data streams can be recovered by passing the commutated output data streams through an identical commutator running at the same CSR and CCR, except where the outputs of the second commutator are used as inputs and vice versa.

Reference is now had to U.S. Pat. No. 4,450,557 issued to E. Munter, assigned to the assignee of the present invention and incorporated by reference herein in its entirety. U.S. Pat. No. 4,450,557 describes a manner of achieving non-blocking time and space switching of a plurality of frame-based input signals.

Figure 14:
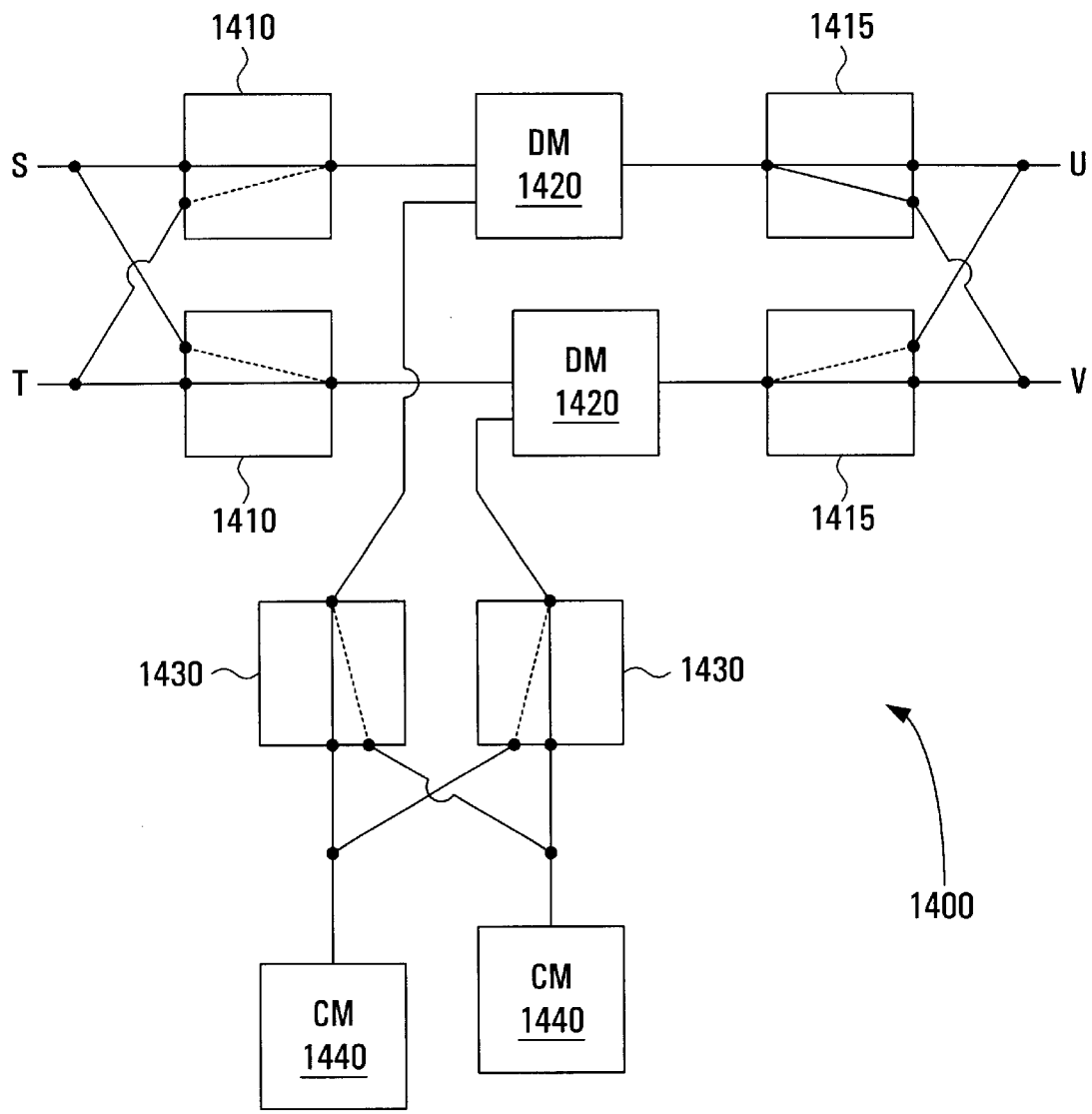
FIG. 14 shows a block diagram of a two-by-two space time switch.

Specifically, with reference to FIG. 14, a switch 1400 according to U.S. Pat. No. 4,450,557 has 2 inputs S, T and 2 outputs U, V. The switch 1400 comprises two sets of switches 1410, 1415 flanking either side of set of data memories 1420. Another set of switches 1430 is connected between a pair of connection memories 1440 and respective data memories 1420. The rate of switching the switches 1410, 1415, 1430 is the same and is fixed.

The connection memories 1440 contain a desired time slot interchange map for each output U, V. Because of the interaction of switches 1410, 1415, 1430, and because the specific connection memory 1440 used to read from a given data memory 1420 varies as a function of time, the time slot interchange maps stored by the connection memories 1440 can be used to achieve non-blocking time and space switching.

In the general case where there are more than two inputs and more than two outputs, non-blocking time and space switching can be conceptually achieved by providing commutators instead of switches 1410, 1415, 1430. However, in the case of a very large and high-capacity switch, a straightforward extension of the concepts introduced in U.S. Pat. No. 4,450,557 leads to a grossly impractical realization of a commutative switch. For example, when it is desired to build a P×P non-blocking switch, the required size of the commutators on either side of the data memory bank is P×P. Thus, if it is desired to build a 2.56 Tbps switch capable of accepting inputs of 10 Gbps per input, then P=2.56 Tbps/10 Gbps=256 and the required commutator size is therefore 256×256.

However, using currently available technology, it is virtually impossible to build commutators of this size. Simply by observing the increase in complexity brought on by moving from commutator 900 (in FIG. 9) to commutator 930 (in FIG. 3), it can be understood that moving from a 16×16 commutator to a 256×256 commutator requires an excessively complex wiring pattern. Furthermore, it is highly impractical to construct integral devices with 256 high-speed inputs and 256 high-speed outputs.

According to the invention, the implementational difficulties associated with constructing large commutative switches are alleviated by distributing the functionality of various elements of the switch among multiple circuit cards.

To begin with, large commutators are built from smaller ones using a procedure such as the following, which applies to the construction of a P×P commutator:
1) Factorize P into M and N;
2) Assemble a first group of N commutators (each of size M×M) and a second group of M commutators (each of size N×N);
3) Connect the $m^{th}$ output of the $n^{th}$ commutator in the first group to the $n^{th}$ input of the $m^{th}$ commutator in the second group, where $1 \leq m \leq M$ and $1 \leq n \leq N$; and
4) Set the CSR for the commutators in one group equal to the CCR of the commutators in the other group.

Figure 10:
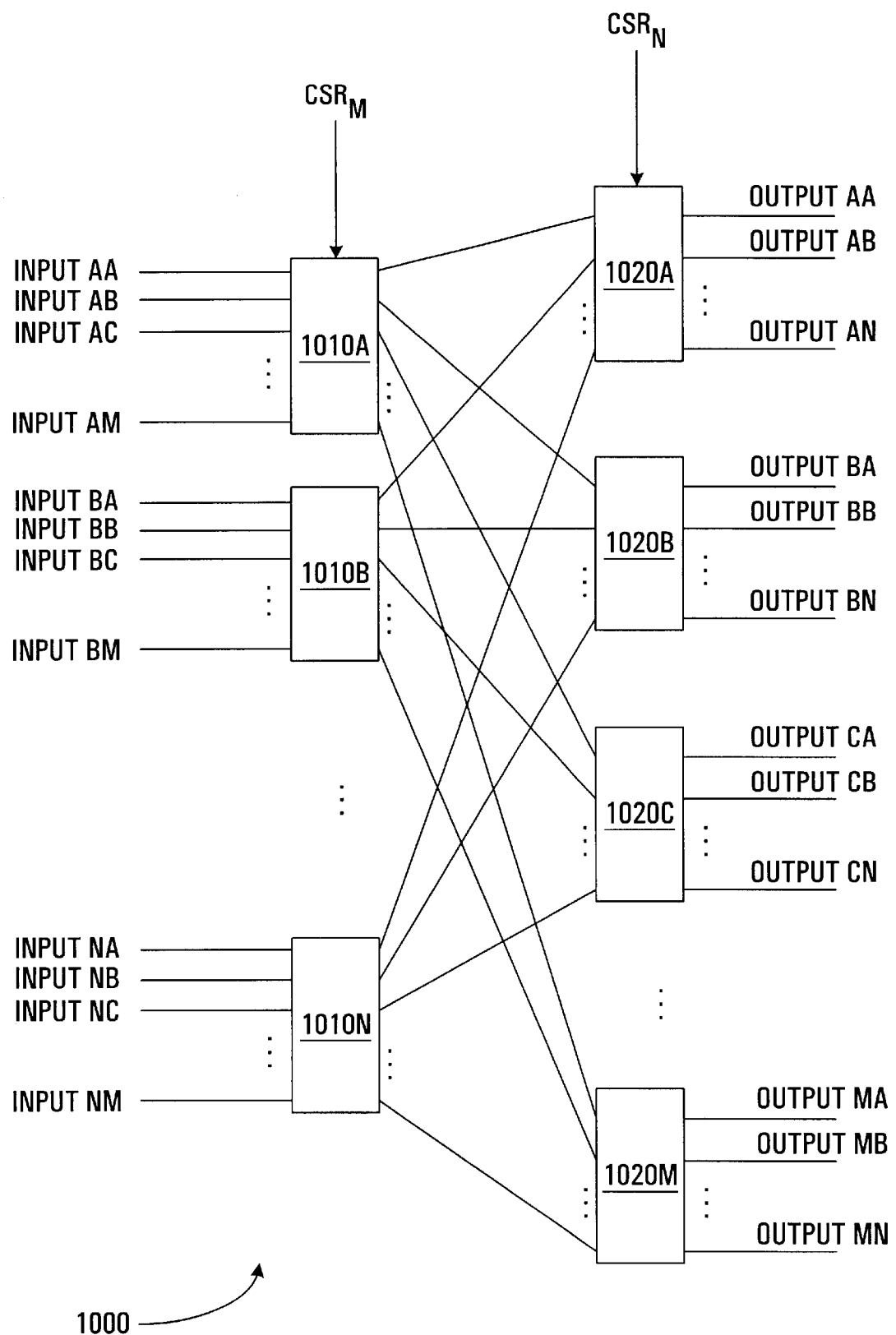
FIG. 10 is a block diagram of a P×P commutator distributed as N M×M commutators connected to M N×N commutators, where P=M*N.

With reference to FIG. 10, there is shown a P×P commutator 1000 constructed in accordance with the above procedure. Specifically, P=M*N and there are N commutators 1010A–1010N of size M×M (i.e., M-way commutators) connected to M commutators 1020A–1020M of size N×N (i.e., N-way commutators). The M×M commutators 1010A–1010N have a CSR denoted $CSR_M$ and the N×N commutators 1020A–1020M have a CSR denoted $CSR_N$. By harmonically relating $CSR_M$ and $CSR_N$, commutator 1000 can be made to behave as a P×P commutator.

Figure 15:
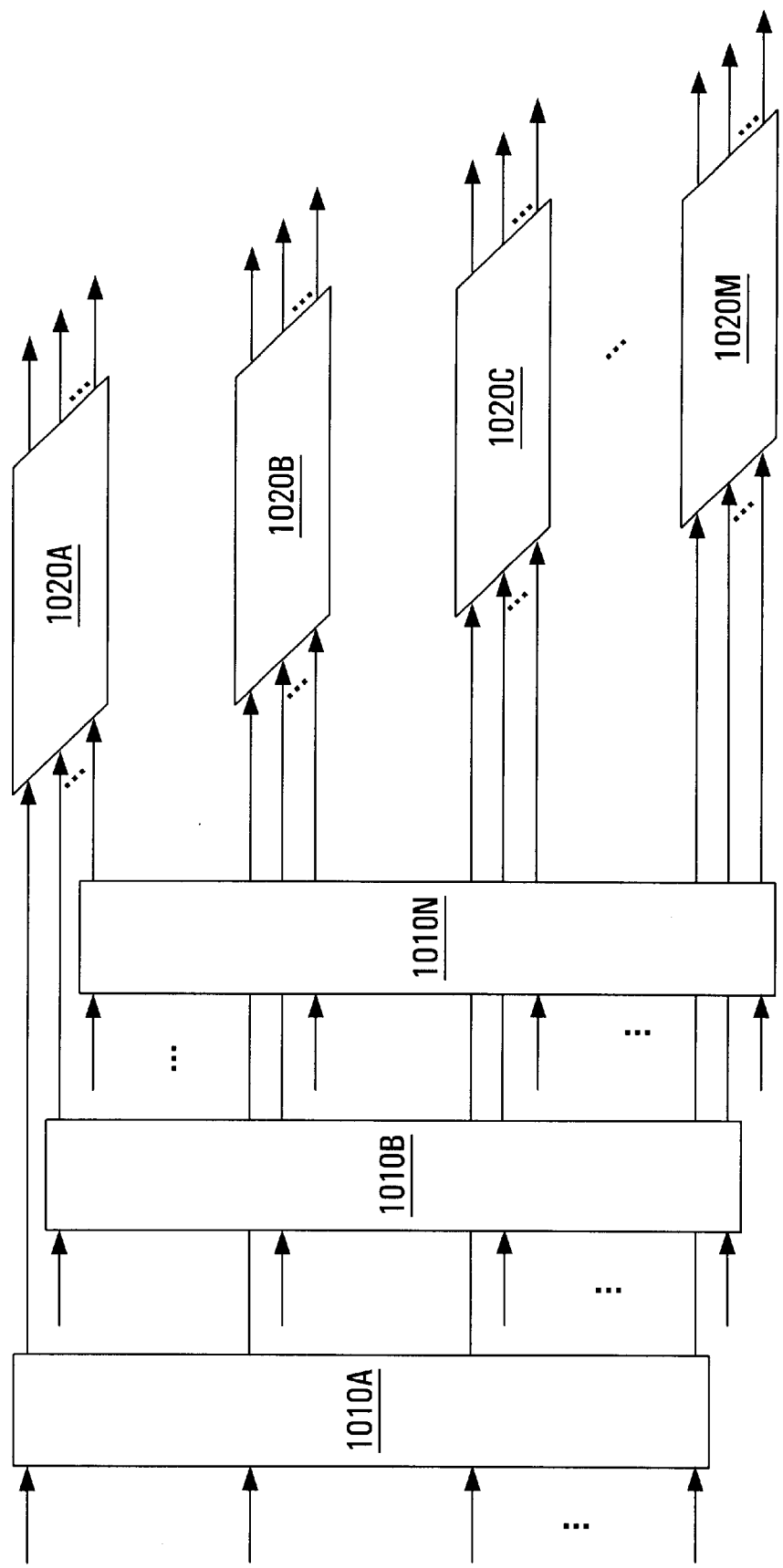
FIG. 15 shows how an orthogonal interconnection of commutators in FIG. 10 simplifies the wiring arrangement between the sets of commutators.

It is noted in FIG. 10 that if the two sets of commutators 1010A–1010N, 1020A–1020M lie in the same plane, then the interconnect region between the commutators exhibits a complicated wiring pattern. It has been recognized by the inventors that this wiring pattern can be significantly simplified by placing the commutators in one set in a different plane than the commutators in the other set. For example, the desired effect can be achieved by placing commutators 1020A–1020M orthogonally with respect to commutators 1010A–1010N, as shown in FIG. 15. It is seen that the wiring pattern is greatly simplified, as each connection between two commutators is a straight-through connection and can be made to have substantially the same length, leading to improved conditions for signal propagation.

Thus, it has been shown how a P×P commutator (where P=M*N) can be divided into a set of N commutators connected to a set of M commutators. This fact is used to partition a large conceptual commutative switch into workable elements. For example, with reference to FIG. 7, there are shown various functional elements of a large commutative switch 700 according to the preferred embodiment of the present invention. Also shown is the manner in which the functional elements of the switch 700 are physically distributed among a set of circuit cards 201A–K, 202A–K, 300A–300L.

Functionally, the P-input, P-output switch 700 consists mainly of two large distributed P×P commutators 740, 745 flanking either side of a large distributed time switch 750. Commutator 740 is built from N commutators 230A–230N (each of size M×M) and M commutators 320A–320M (each of size N×N) according to the above described method. Similarly, commutator 745 has been built from M commutators 330A–330M (each of size N×N) and N commutators 235A–235N (each of size M×M) according to the above described method. The interconnect pattern within each of the compound commutators 740, 745 is greatly simplified by providing orthogonality between the circuit cards comprising commutators 230A–230N and those comprising commutators 320A–320M, and between the circuit cards comprising commutators 235A–235N and those comprising commutators 330A–330M.

The commutators 740, 745 and the time switch 750 are distributed among K receive port cards 202A–202K, K transmit port cards 201A–201K and L switch cards 300A–300L. In the preferred embodiment, K is equal to N and L is equal to M/2. Of course, it is to be understood that the number of port cards and the number of switch cards is arbitrary and may depend on the amount of processing required to support the components on each card.

Each of the receive port cards 202A–202K is equipped with a respective one of the commutators 230A–230N and a respective one of a plurality of receive processing sections 760A–760K connected to the respective commutator. Similarly, each of the transmit port cards 201A–201K is equipped with a respective one of the commutators 235A–235N and a respective one of a plurality of receive processing sections 765A–765K connected to the respective commutator.

Also, because L=M/2, each of the switch cards 300A–300L is equipped with two of the commutators 320A–320M, two of the commutators 330A–330M and a common processing section 730 connected to each commutator.

Figure 7:
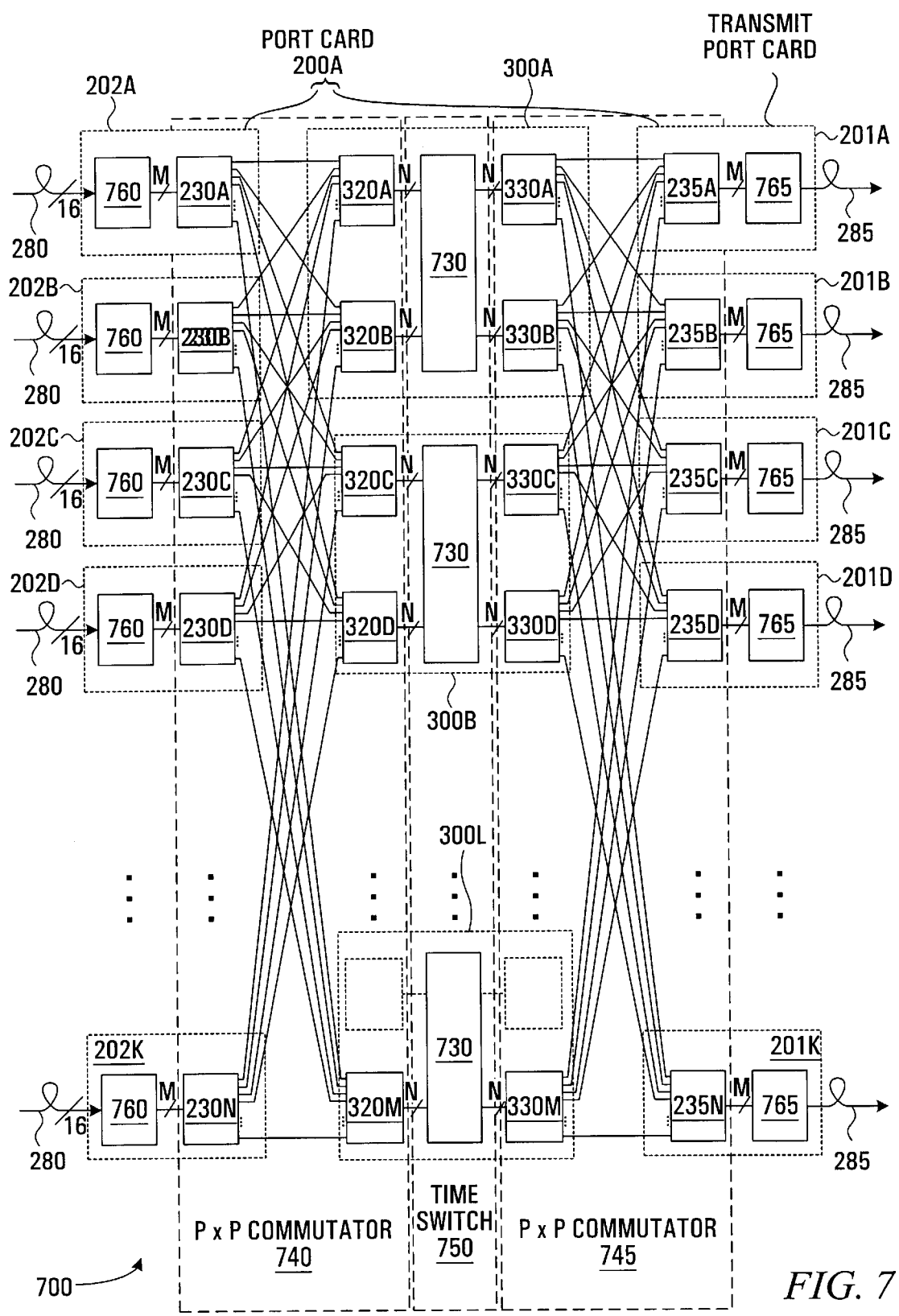
FIG. 7 is a functional diagram of the optical cross-connect of FIG. 1A.

It is apparent from FIG. 7 that the interconnect region existing between sets of commutators 230A–N and 320A–M is complex. If an attempt is made at building a backplane through which receive port cards 202A–202K can be connected to switch cards 300A–300L, then such a backplane would have to be 16 traffic layers thick (leading to a thickness of approximately 48 physical layers) in order to accommodate the complex interconnection requirements. Such backplanes are not only expensive to build, but take up a sizable physical volume and must be handled with extreme care. A similar scenario arises if the switch cards 300A–300L are to be connected to the transmit port cards 201A–201K via a standard backplane.

In order to alleviate such interconnection difficulties, the invention exploits the advantages of orthogonality described earlier with respect to FIG. 15 and provides a mid-plane architecture which is now described with reference to FIGS. 1A through 1D.

Figure 1A:
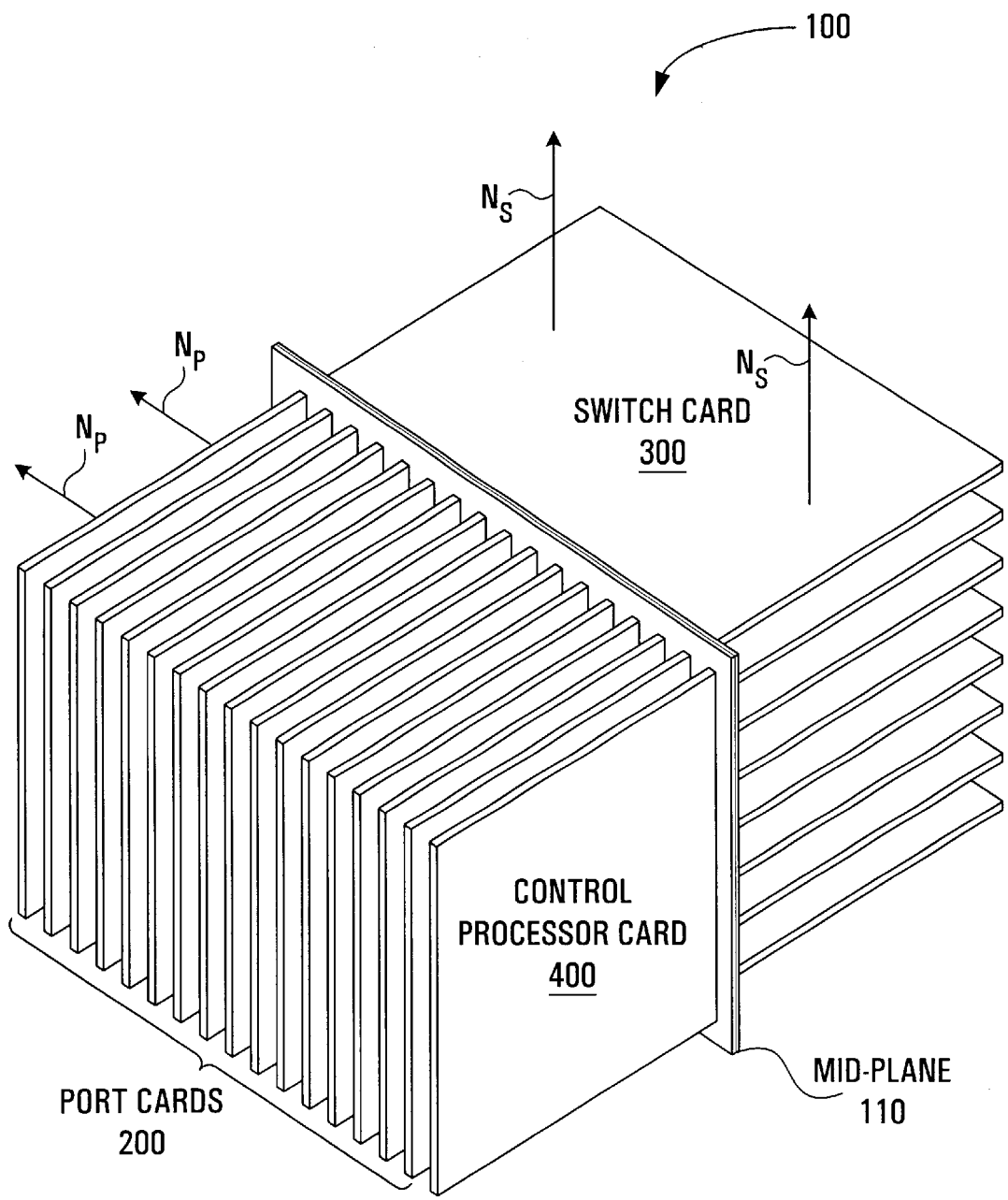
FIG. 1A is a perspective view of a high-capacity optical cross-connect including a set of parallel port cards connected to a set of parallel switch cards at a mid-plane, according to the preferred embodiment of the present invention.
Figure 1B:
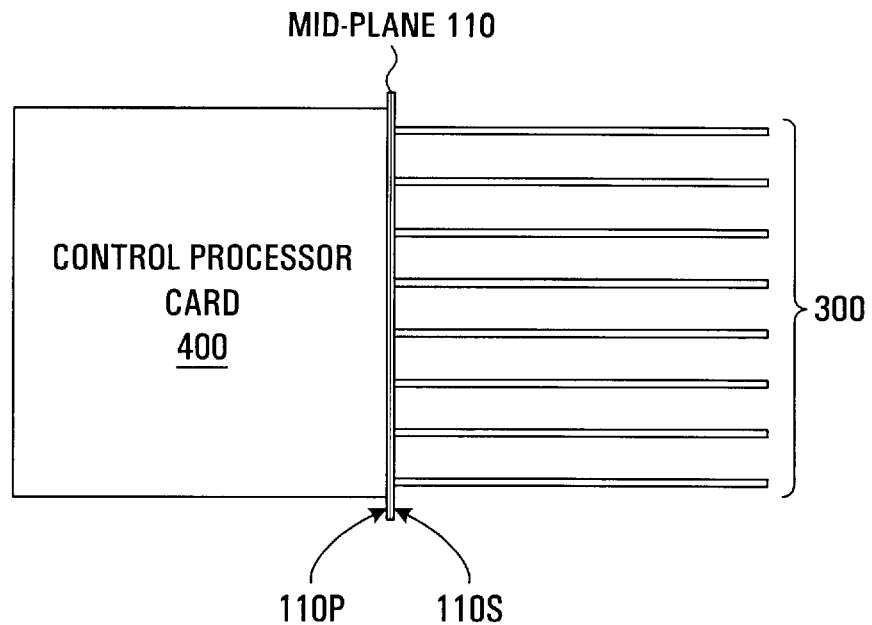
FIG. 1B is a side elevational view of the optical cross-connect of FIG. 1A.
Figure 1C:
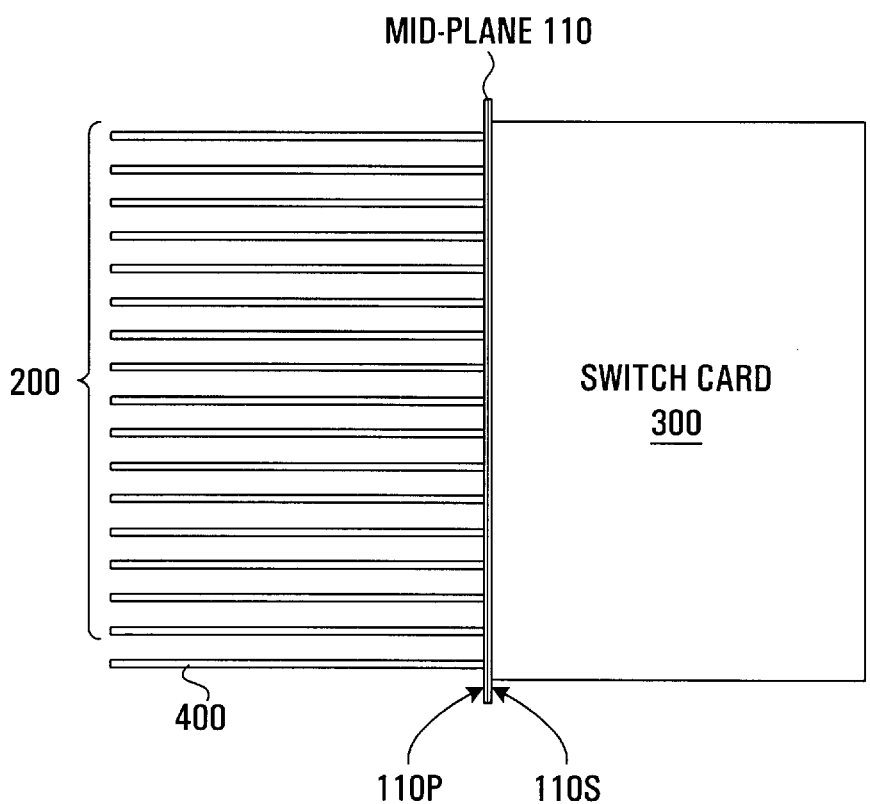
FIG. 1C is an overhead view of the optical cross-connect of FIG. 1A.

Preferably, each of the receive port cards 202A–202K is grouped together with a respective one of the transmit port cards 201A–201K into a single universal (combined transmit and receive) port card that provides both input and output functionality. Accordingly, FIGS. 1A, 1B and 1C depict a switching unit 100 in accordance with the preferred embodiment of the present invention, where one parallel set of universal port cards 200A–200K (herein after referred to simply as "port cards") is shown connected to a parallel set of switch cards 300A–300L via a single mid-plane 110. The switching unit 100 also comprises one or more control processor cards 400 which could be connected to the mid-plane 110 in any suitable way, such as in parallel with the port cards 200A–200K as shown in FIG. 1A.

Figure 1D:
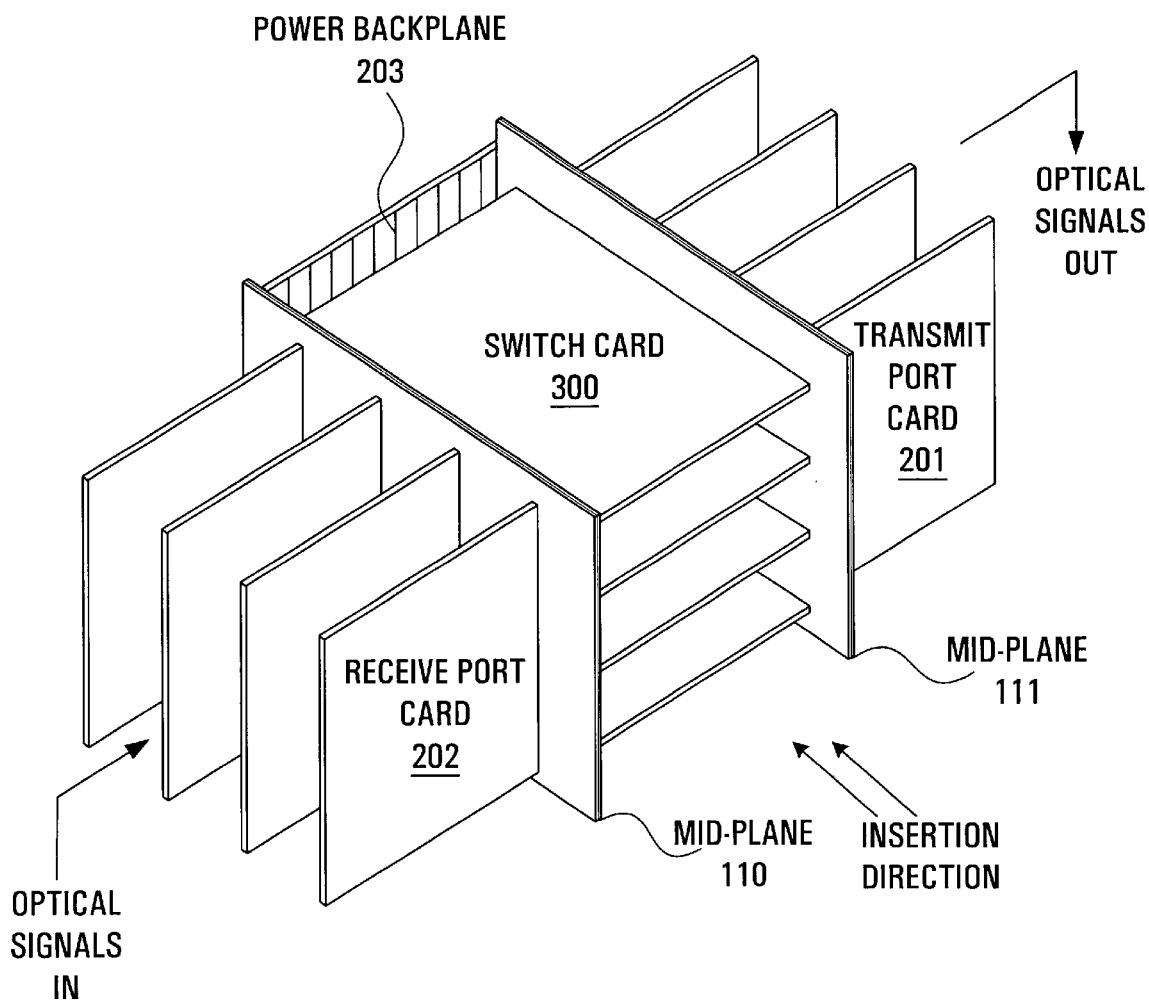
FIG. 1D is a perspective view of a high-capacity optical cross-connect including two sets of parallel port cards connected to a set of parallel switch cards by two mid-planes.

Alternatively, FIG. 1D shows an embodiment in which the switch cards 300A–300L are connected to the receive port cards 202A–202K via a first mid-plane 110 and are connected to the transmit port cards 201A–201K via a second mid-plane 111. Each of the switch cards 300A–300L is tilted at 90 degrees with respect to the plane of each of the receive port cards 202A–202K and transmit port cards 201A–201K. The first mid-plane 110 provides an electrical connection between each of the receive port cards 202A–202K and all of the switch cards 300A–300L, while the second mid-plane 111 provides an electrical connection between each of the switch cards 300A–300L and all of the transmit port cards 201A–201K.

The switching unit 100 may also be referred to as an optical cross-connect (OXC), since it provides the capacity and granularity to interconnect entire payloads of optical bit streams. These optical bit streams enter and exit the OXC 100 through processing sections 760A–K, 765A–K in the port cards 200A–200K, which were briefly touched upon earlier with reference to FIG. 7 and will be described in further detail herein below. The optical bit streams are exchanged (via optical fiber) between the OXC 100 and central office equipment in one or more locations.

By way of the mid-plane 110, each of the port cards 200A–200K has a high-speed connection to all of the switch cards 300A–300L and each of the switch cards 300A–300L has a high-speed connection to all of the port cards 200A–200K. This can be achieved by orienting the port cards 200A–200K and the switch cards 300A–300L in different directions and providing a simple electrical interconnect mapping through the mid-plane 110. Using a more general formulation, a simple interconnect mapping can be used as long as the normal orientation of the port cards 200A–200K (indicated by arrows $N_P$) is not parallel to the normal orientation of the switch cards 300A–300L (indicated by arrows $N_S$).

A preferred orientation of the port cards 200A–200K relative to the switch cards 300A–300L is shown in FIGS. 1A, 1B and 1C, where $N_P$ is at right angles to $N_S$. Alternatively, the port cards and switch cards could meet each other obliquely rather than orthogonally, in which case the angle between $N_S$ and $N_P$ would be greater or less than 90 degrees. In either case, the interconnect problem of FIG. 10 is solved, leading to an interconnect pattern more similar to that in FIG. 15.

It is to be understood that any suitable mechanical structure (such as a chassis and a set of card guides) could be used for maintaining the port cards 200A–200K and the switch cards 300A–300L substantially fixed in relation to each other. Preferably, the chosen support structure will allow the port cards 200A–200K and the switch cards 300A–300L to be removed by an operator if such cards are found defective or for any other reason.

The mid-plane 110 serves two functions. Firstly, it allows for electrical contact between each port card and all switch cards, and between each switch card and all port cards. This can be achieved merely by providing an opening through which complementary pins on the port card switch cards can mate. Alternatively, this can be achieved by providing an electrical pathway between an arrangement of conductive pins on a port side 110P and a similar arrangement of conductive pins on a switch side 110S.

Figure 4A:
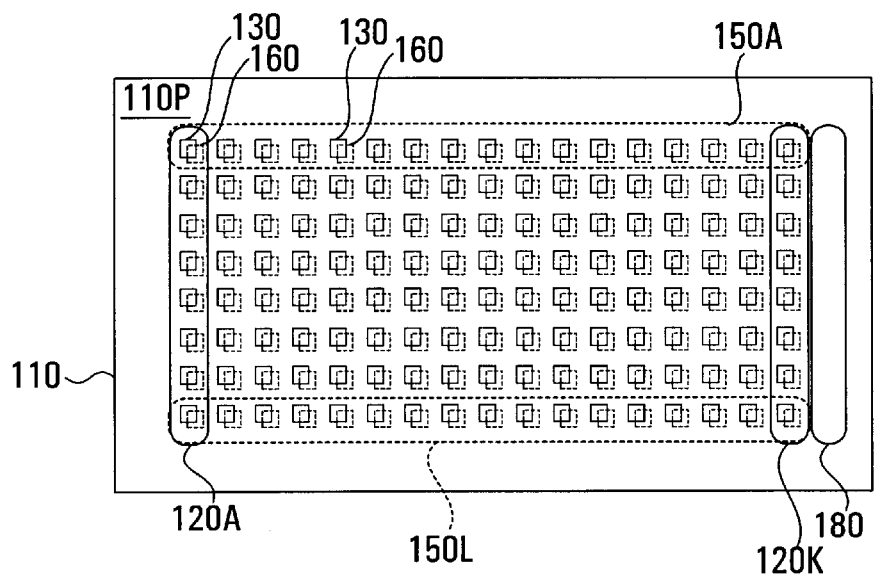
FIG. 4A is a front elevational view of the mid-plane, showing a plurality of connectors and high-speed data connection areas.

Specifically, with reference now to FIG. 4A, in which is shown in greater detail the physical layout of the mid-plane 110 as viewed from the port side 110P, the port side 110P is seen to comprise a number of connectors (shown in solid outline at 120A–120K) for accommodating respective port cards. Shown in dotted outline at 150A–150L is a similar but perpendicularly oriented arrangement of connectors for accommodating respective switch cards on the switch side 110S of the mid-plane 110. Of course, if the port cards 200A–200K are obliquely arranged relative to the switch cards 300A–300L, then the pairs of connectors 120i, 150j will be obliquely oriented for 1<=i<=k and 1<=j<=L.

In addition, a connector 180 for connecting the control processor card 400 to the mid-plane 110 is shown on the port side 110P. Of course, the connector 180 could be located on the switch side 110S and it could be oriented differently (i.e., not in parallel with any of connectors 120A–120K or 150A–150L). Furthermore, there may additional connectors for connecting duplicate control processor cards (in case of failure of control processor card 400).

Figure 4B:
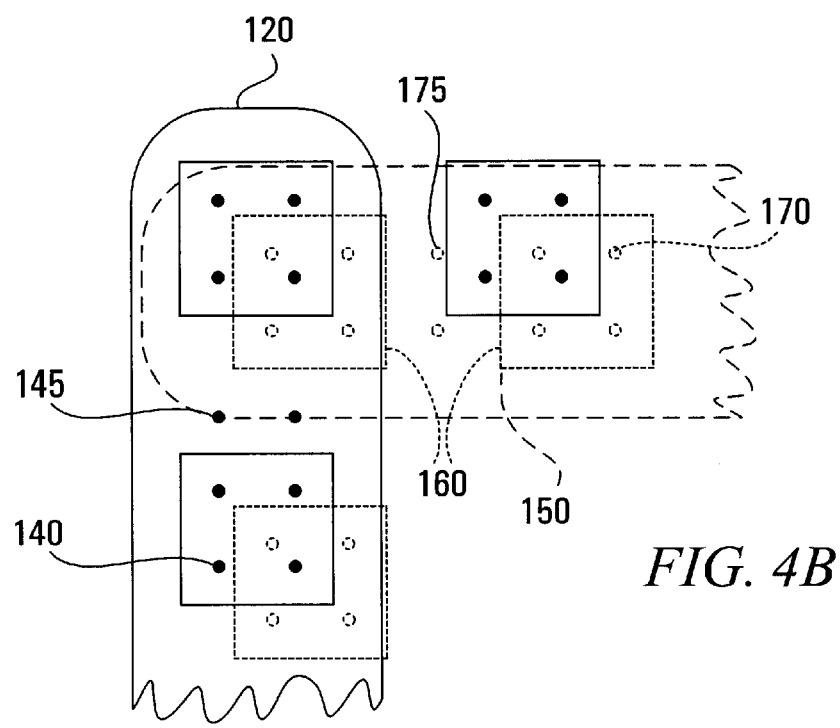
FIG. 4B shows in more detail part of the mid-plane as seen in the view of FIG. 4A.

Each of the connectors 120A–120K consists of a plurality of high-speed data connection areas 130, one for each switch card. Thus, in the case where there are K port cards and L switch cards in the OXC 100, the high-speed data connection areas 130 will be laid out in a matrix structure having K columns of L rows. As shown in FIG. 4B, each high-speed data connection area 130 has an array of one or more high-speed data pins 140. Between the high-speed data connection areas 130 are located "auxiliary" pins 145 which could be used for power, grounding, timing and control.

The term "pin" is used loosely so as to designate any electrical contact point, which includes balanced (single-ended) and differential conductors, such as copper pins and vias, surface mounted pins, through-board pins, double-sided pins et cetera. Also, the term "pin" is used indiscriminately to generically designate both actual protruding pins and receptacles for complementarily mating with such protrusions.

Similarly, each of the connectors 150A–150L consists of a plurality of high-speed data connection areas 160, one for each port card. Thus, in the case where there are K port cards and L switch cards in the OXC 100, the high-speed data connection areas 160 will be laid out in a matrix structure having L rows of K columns. As shown in FIG. 4B, each high-speed data connection area 160 has an array of one or more high-speed data pins 170. Between the high-speed data connection areas 160 are located auxiliary pins 175 which could be used for power, grounding, timing and control.

The mid-plane 110 provides electrical contact between the high-speed data pins 140 in each high-speed data connection area 130 on the port side 110P and respective high-speed data pins 170 in a corresponding high-speed data connection area 160 on the switch side 110S. Since the number of high-speed data connection areas (and the number of high-speed data pins per high-speed data connection area) on both sides of the mid-plane is the same, there is a one-to-one correspondence between the high-speed data connection areas (and the high-speed data pins) on either side.

In order to establish an electrical connection between two high-speed data pins (one on either side of the mid-plane 110), any suitable technique may be used. For example, the two high-speed data pins in question could be connected by electrical vias and pathways through one or more printed circuit board layers in the mid-plane 110. In general, the shorter the path, the less the propagation delay and distortion, and the higher the performance.

Also, it is noted from FIG. 4B that although connection areas 130, 160 intersect, the high-speed data pins 140 on one side of the mid-plane are slightly offset from the data pins 170 on the other side. This can be done to allow conventional pins mounted on one side of the mid-plane 110 to run all the way through the mid-plane and emerge on the other side. Of course, those skilled in the art will appreciate that the pins on opposite sides of the mid-plane may overlap if surface-mounting technology is used. Alternatively, one ling pin can be used to mate with both the port card and the switch card.

The second function of the mid-plane 110 is to enable the provision of "auxiliary" functions such as power, grounding, timing and control. Therefore, the mid-plane 110 does not provide electrical direct contact between the auxiliary pins 145 on the port side 110P and the auxiliary pins 175 on the switch side 110S. Rather, the auxiliary pins associated with each of the connectors 120A–120K, 150A–150L are electrically connected (via pathways through one or more conductive layers in the mid-plane) to either the control processor card 400 or the central office.

Auxiliary functions involving the central office include power and grounding. To provide power to the circuit cards in the OXC 100, a separate power line could be provided from the central office to a single area on one side of the mid-plane 110, which area is then electrically connected to an auxiliary pin on each of the connectors 120A–120K, 150A–150L. To provide grounding of the circuit cards in the OXC 100, one auxiliary pin from each of the connectors 120A–120K, 150A–150L could lead to a common area on the mid-plane 110 which could be connected to a local ground reference or to a ground reference shared with the central office.

The remaining functions (e.g., timing and control) involve the control processor card 400, which is now described in further detail with reference to FIG. 11. The control processor card 400 is constructed so as to mate with a connector 180 on the mid-plane which, in the preferred embodiment, is located on the port side 110P of the mid-plane 110 and is parallel to connectors 120A–120K.

Figure 11:
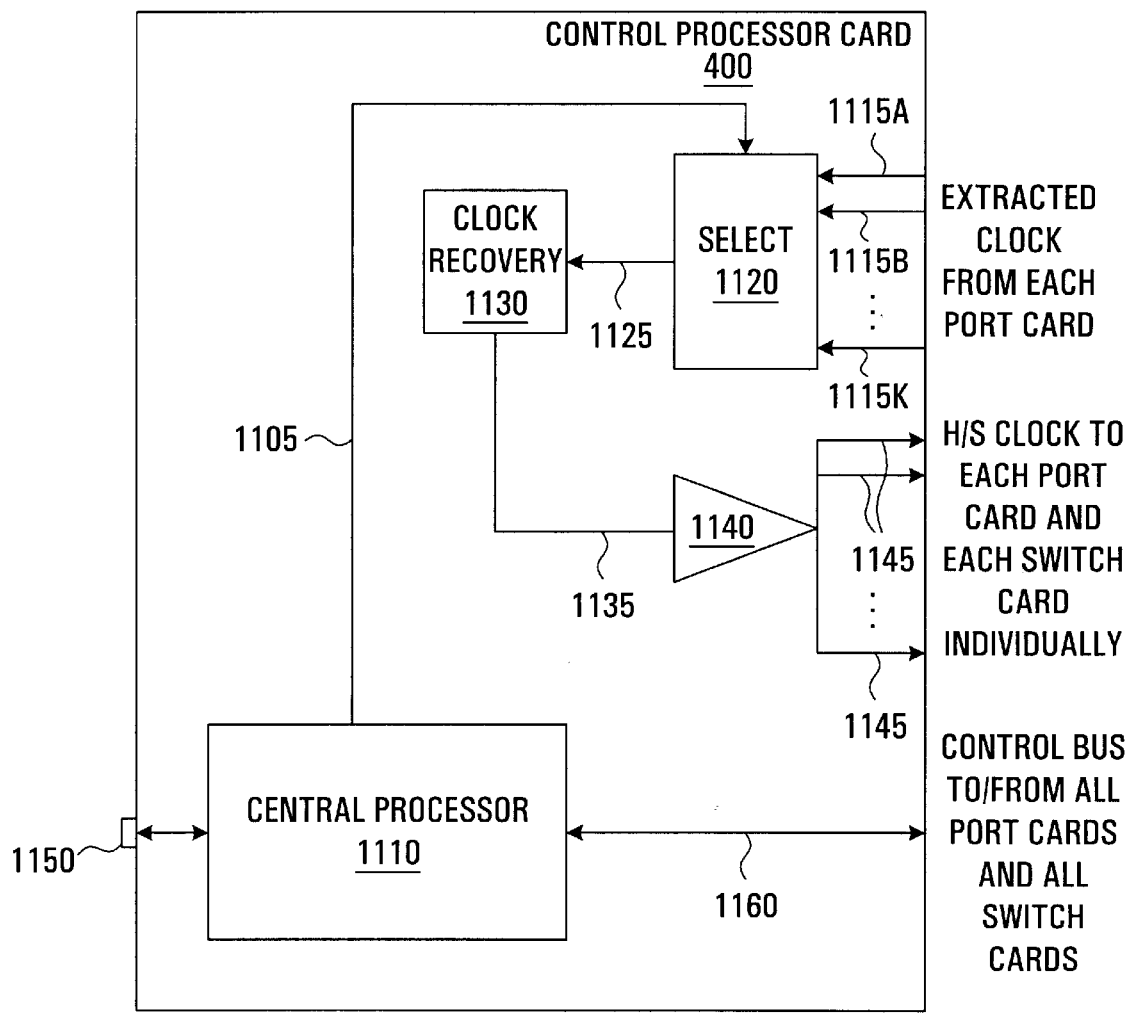
FIG. 11 is a block diagram of a control processor card.

With reference to FIG. 11, therefore, the control processor card 400 accepts extracted clock signals from the mid-plane via signal lines 1115A–1115K. Each of the signal lines 1115A–1115K carries a clock signal extracted by a respective one of the port cards 200A–200K and delivered to the mid-plane via one of the auxiliary pins belonging to the connector associated with the respective port card.

Figure 2:
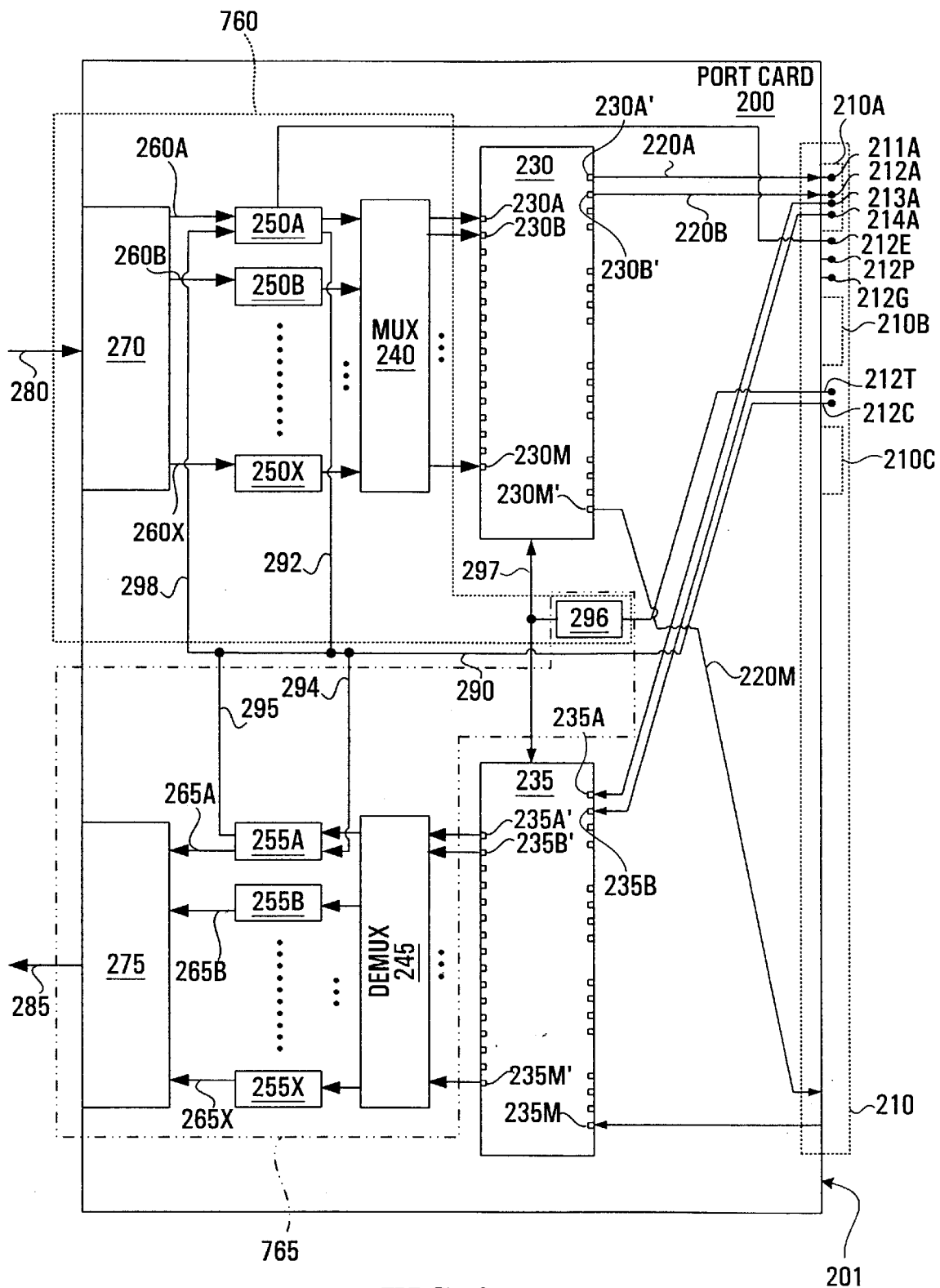
FIG. 2 is a block diagram of a port card, according to the preferred embodiment of the present invention.

The extracted clock signals on signal lines 1115A–1115K (arriving from the port cards via pins such as pin 212E on port card 200 in FIG. 2) are fed to a selector 1120 which allows only one of these extracted clock signals to pass through to signal line 1125 in response to a control signal received from a central processor 1110 along a control line 1105. The selected extracted clock signal carried by signal line 1125 is fed to a clock recovery unit 1130. The clock recovery unit 1130 comprises circuitry such as a phase-locked loop (PLL) for locking the OXC clock source to the precise frequency of the network reference clock signal.

The precise timing reference produced by the clock recovery unit 1130 is used as a high-speed clock for synchronizing the entire OXC 100. This high-speed clock is fed to a clock driver 1140 along a signal line 1135. The driver 1140 comprises circuitry for outputting the high-speed clock to the mid-plane along individual clock lines 1145, one for each circuit card (i.e., one high-speed clock signal is destined for each of the port card 200A–200K and each of the switch cards 300A–300L).

Thus, a centralized source (e.g., the clock recovery unit 1130) distributes a clock signal to one auxiliary pin in each of the connectors 120A–120K, 150A–150K along an individual point-to-point electrical pathway through the mid-plane 110. To ensure accurate timing distribution, the pathways should all be designed to have the same length irrespective of the distance between the control processor card 400 and the target auxiliary pin on each of the connectors 120A–120K, 150A–150L. This can be achieved by using an indirect folded electrical path for connectors associated with closer cards and choosing a more direct pathway for connectors associated with more distant cards.

In addition, the control processor exchanges control information with one or more auxiliary pins on each of the connectors 120A–120K, 150A–150L. This control information is preferably exchanged at a speed that is suitable for the interconnection of a central processor to a number of dependent entities, which is usually substantially lower than the speed at which the extracted clock signals or the high-speed clock signal are exchanged. Thus, a serial or parallel bus architecture (e.g., bus 1160) can be used. The bus is connected to central processor 1110.

The central processor 1110 is preferably a microprocessor running an algorithm. This algorithm contains a portion for selecting the selected extracted clock signal which could be based on the precise timing reference produced by the clock recovery unit 1130. Another portion of the algorithm is concerned with processing the control information received from the circuit cards along the bus 1160 and generating control information for transmission to the various circuit cards. The central processor 1110 is preferably connected to a port 1150 leading to the central office, where a higher level of processing may take place.

Reference is now made to FIG. 2, which shows a generic port card 200 according to the preferred embodiment of the invention, equipped with a connector 210, a pair of M×M commutators 230, 235 and a pair of processing sections 760, 765 connected to commutators 230, 235, respectively. Port card 200 structurally represents any of the port cards 200A–200K in the OXC 100.

Connector 210 is disposed along an edge 201 of the port card 200 and comprises L high-speed data connection areas 210A–210L, one for each switch card. The high-speed data connection areas 210A–210L each comprise a set of high-speed data pins for communicating high-speed data with respective high-speed data pins 140 belonging to a connection area 130 on the port side 110P of the mid-plane 110. Also, connector 210 comprises a plurality of auxiliary pins 212C, 212T, 212G, 212P and 212E which are interspersed among the high-speed connection areas 210A–210L.

Generally, the high-speed data pins in each high-speed connection area transport an aggregate bandwidth of R*K/L Gbps, where R is the bandwidth of each of P signals being processed by commutators 740, 745 (in FIG. 7), K is the number of port cards and L is the number of switch cards. A possible value for R is 10, corresponding to an OC-192 signal, although the invention will work for any value of R. Without loss of generality, it can be assumed that a single high-speed data pin can carry one of P signals at R Gbps and therefore the number of pins per high-speed connection area is K/L in each direction of communication (to and from the mid-plane 110).

Thus, if there are twice as many port cards as switch cards (as shown in the illustrated embodiment), then the number of high-speed data pins per high-speed connection area will be four. Therefore, high-speed data connection area 210A in particular is shown to comprise four high-speed data pins, 211A, 212A, 213A, 214A, among which pins 211A and 212A transport high-speed data from commutator 230 to the mid-plane 110 and pins 213A and 214A carry high-speed data from the mid-plane to commutator 235.

Preferably, each high-speed data pin 211A, 212A, 213A, 214A is a single pin carrying data at R Gbps (e.g., 10 Gbps) or is a group of Q pins carrying R/Q Gbps per pin.

Connector 210 is matched with a corresponding one of the connectors 120A–120K on the port side 110P of the mid-plane 110. In fact, each of the pins associated with connector 210 are aligned with respective pins in the corresponding connector on the port side 110P of the mid-plane 110 and are provided with a complementary mating assembly. Thus, when port card 200 is connected to the port side 110P of the mid-plane, the high-speed data pins associated with each connection area 210A–210L electrically mate with the corresponding set of high-speed data pins in the corresponding connection areas 130 belonging to the corresponding port-side connector, while the auxiliary pins from connector 210 electrically mate with the auxiliary pins belonging to the corresponding port-side connector.

In order to ensure good electrical contact between a pair of connectors (connector 210 on the port card 200 and a corresponding connector on the port side 110P of the midplane 110), it is possible to rely on a frictional contact force. However, in the case where several hundred pins may be used, it is preferable to use known ZIF (zero insertion force) connectors which provide a means for applying a contact force after physical positioning of the card and, even more importantly, a means for removing the contact force prior to physical movement of the card.

At the other end of the port card 200 is provided an optical receive circuit 270 for accepting a plurality of optical signals from a set of external input optical fibers, collectively denoted by reference numeral 280. The data rate of the signal arriving on each of the external input optical fibers 280 is matched to the commutator port capacity, either by straight mapping or by a synchronized multiplexer or demultiplexer. Collectively, the bandwidth of all the signals entering the optical receive circuit should equal M*R Gbps, where M is the size of the N×N commutator in the port card and R is the rate handled by each pin 211A, 212A, 213A, 214A. Thus, there may be one or more external input fibers 280 entering the optical receive circuit 270.

The optical receive circuit 270 (which could be multiple individual optical receive circuits) comprises optoelectronic conversion circuitry for converting the optical signals arriving on external input optical fiber(s) 280 into a plurality of digital electronic signals which are fed to a bank of processing and conditioning units 250A–250X along respective signal lines 260A–260X. If the incoming optical signals carry data at rates that are higher than R Gbps, then the optical receive circuitry 270 preferably comprises additional circuitry for synchronously demultiplexing the signals into individual electronic signals having a rate of R Gbps. If the incoming optical signals carry data at rates that less than R Gbps, then the optical receive circuitry 270 preferably comprises additional circuitry for synchronously combining multiple the signals into individual electronic signals having a rate of R Gbps.

Each of the processing and conditioning units 250A–250X preferably comprises circuitry for monitoring the quality of the respective signal received from the optical receive circuit 270. If the incoming signal is a SONET signal, for example, then this signal will consist of frames and each frame will generally have a header portion reserved for 10 carrying control information. In this case, each of the processing and conditioning units 250A–250X will preferably comprise circuitry such as a frame find unit (for locating the boundaries of incoming frames and extracting a clock) and a processor (for processing the information in the header of each frame). Similar processing circuitry could be provided for switching entire 10-gigabit Ethernet or 1-Gigabit Ethernet signals (as opposed to routing individual frames).

Any control information to be sent by the processing and conditioning units 250A–250X to the control processor card 400 can be exchanged via a control bus 290, which could be a serial bus or a parallel bus. For example, in the particular case of processing and conditioning unit 250A, signal quality information could be output onto control bus 290 via a control link 292. Also, in order to allow processing and conditioning unit 250A to be accessed by an external operator (e.g., during re-programming), access could be provided by a control link 298 emanating from the same control bus 290. Control bus 290 is connected to auxiliary pin 212C, which is designed to mate with a complementary auxiliary pin on the port side of the mid-plane which is electrically connected to the control bus 1160 on the control processor card 400.

Furthermore, the clock signal extracted by one or more of the processing and conditioning units (in this case processing and conditioning unit 250A) could be used as the extracted clock signal which is connected to auxiliary pin 212E or multiples thereof. Alternatively, each of the processing and conditioning units 250A–250X could output an extracted clock signal to a selector, the output of which would be connected to auxiliary pin 212E. Auxiliary pin 212E is designed to mate with a complementary pin on the port side of the mid-plane which is electrically connected to a respective one of the signal lines 1115A–1115K leading to the selector 1120 in the control processor card 400. Thus, an extracted clock is fed to the clock recovery circuit 1130 on the control processor card 400 for use as a reference clock.

The set of processing and conditioning units 250A–250X is connected to via an optional TDM mux 240 to a set of input ports 230A–230M of M×M commutator 230. The optional TDM mux 240 is present in order to provide the capability to multiplex several signals at a lower rate (less than R Gbps) into a signal having a rate of R Gbps. Not shown is an optional demultiplexer, which would be used to separate a higher-bandwidth signal into multiple individual signals of bandwidth R Gbps each.

In any event, there will be M signals (at R Gbps each) arriving at the commutator 230. Commutator 230 is an M×M commutator with a commutation step rate that is controllable by a sequencing signal arriving on a sequencing signal line 297. The sequencing signal is output by a sequencing unit 296. The sequencing unit 296 basically consists of clock divider circuitry for dividing a high-speed clock received from auxiliary pin 212T. Auxiliary pin 212T is designed to mate with a complementary pin on the port side of the mid-plane which is electrically connected to a respective one of the clock lines 1145 leading from the clock driver 1140 in the control processor card 400.

In synchronism with the sequencing signal, commutator 230 sequentially switches its M inputs over to M outputs 230A'–230M' which are respectively connected to a plurality of signal lines 220A–220M. Signal lines 220A–220M then lead to respective high-speed data pins on the various high-speed connection areas 210A–10L on connector 210. In the illustrated embodiment, there are L=M/2 high-speed data connection areas 210A–210L but M signal lines 220A–220M. Thus, two signal lines are connected to each one of the high-speed data connection areas 210A–210L.

In the reverse direction, commutator 235 has M inputs, among which each pair is connected to a pair of high-speed data pins in each of the high-speed data connection areas 210A–210L. Commutator 235 is identical to commutator 230 but because commutator 235 handles signals which have already been switched by the switch cards 300A–300L, it performs the inverse function of commutator 230 and therefore, from a sequencing perspective, it is connected backwards so as to reintegrate the slices of data. However, the CSR and CCR remain the same and commutator 235 switches of signals present at its M inputs 235A–235M over to M outputs 235M'–235M' in a repetitive cyclical manner in accordance with the sequencing signal received along sequencing signal line 297.

The output ports 235A'–235M' of commutator 235 are connected to a respective plurality of processing and conditioning units 255A–255X via an optional demux 245. If used, the demux 245 serves to separate one high-capacity signal exiting the commutator 235 at R Gbps into multiple lower-capacity signals.

Processing and conditioning units 255A–255X may comprise circuitry for inserting control information into the header of selected SONET or 10-gigabit Ethernet frames received from the demux 245. This control information could be provided via control links sharing a control bus. By way of example, FIG. 2 shows processing and conditioning unit 255A as being connected to control bus 290 via an input control link 294 and an output control link 295.

Processing and conditioning units 255A–255P are connected to an optical transmit circuit 275 by a respective plurality of signal lines 265A–265X. The optical transmit circuit 275 comprises circuitry for converting the digital electronic signals received from the processing and conditioning units into respective single-wavelength optical signals. Because pins 213A and 214A carry signals at R Gbps, the totality of optical signals output by the optical transmit circuit 275 (or multiple such circuits) will have an aggregate capacity of M*R Gbps. The single-wavelength optical signals generated by the optical transmit circuit 275 is output onto a respective set of external output optical fibers 285.

Thus, when the example port card 200 having M×M commutators 230, 235 is connected to the port side 110P of the mid-plane 110, commutator 230 will provide L sets of M/L high-speed data signals at R Gbps each, with each set of signals being transmitted to a respective one of the L switch cards 300A–300L via the mid-plane 110, while commutator 235 will expect to receive L sets of M/L high-speed data signals at R Gbps each, one set from each switch card via the mid-plane 110. Straight-through high-speed data connections from the port cards to the switch cards are provided by the mid-plane 110.

Figure 5:
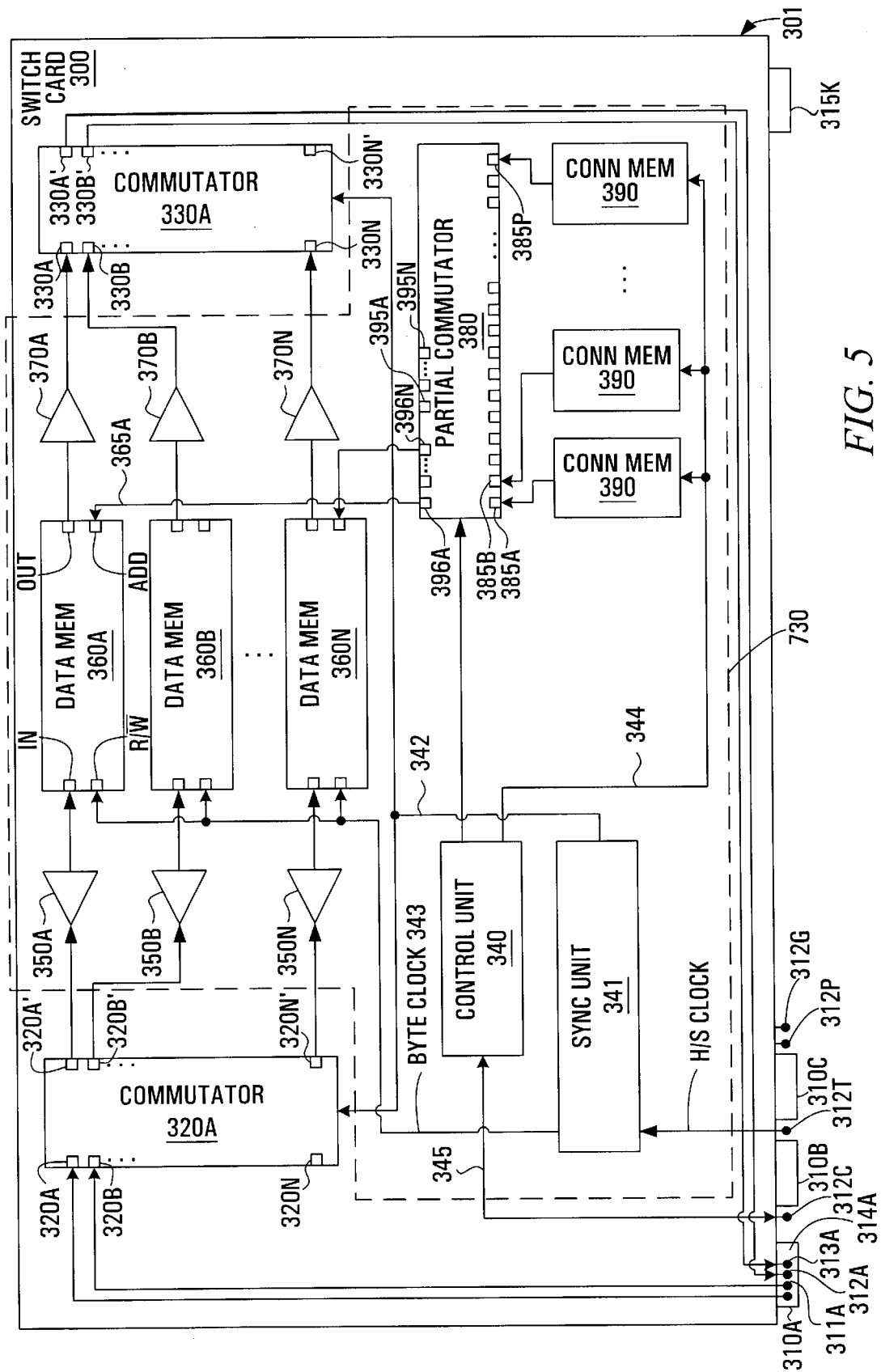
FIG. 5 is a block diagram of a switch card, according to the preferred embodiment of the present invention.

Reference is now made to FIG. 5, which shows a generic switch card 300 in accordance with the preferred embodiment of the present invention. Switch card 300 structurally represents any of the switch cards 300A–300L in the OXC 100, but can be taken to be switch card 300A in FIG. 7 for purposes of illustration. Switch card 300 is equipped with a connector 310, an N×N commutator 320A, an N×N commutator 330A and a processing section 730 connected to the commutators 320A, 330A. It is noted that commutators 320B and 330B—although shown in FIG. 7—are not illustrated in FIG. 5 in order to avoid unnecessarily cluttering the Figure. Nevertheless, their existence is assumed and they are also assumed to be connected to processing section 730.

Connector 310 is disposed along an edge 301 of the switch card 300 and comprises K high-speed data connection areas 310A–310K, one for each port card. The high-speed data connection areas 310A–310K each comprise a set of high-speed data pins for communicating high-speed data with respective high-speed data pins 170 belonging to a connection area 160 on the switch side 110S of the mid-plane 110. Also, connector 310 comprises a plurality of auxiliary pins 312C, 312T, 312G and 312P which are interspersed among the high-speed connection areas 310A–310K.

Generally, the high-speed data pins in each high-speed connection area transport an aggregate bandwidth of R*K/L Gbps where, as before, R is the bandwidth of each of P signals being processed by commutators 740, 745 (in FIG. 7), K is the number of port cards and L is the number of switch cards. Again, without loss of generality, it can be assumed that a single high-speed data pin can carry one of P signals at R Gbps and therefore the number of pins per high-speed connection area is K/L in each direction of communication (to and from the mid-plane 110). Nevertheless, it is within the scope of the invention to use a multiplicity of lower-speed pins.

Thus, if there are twice as many port cards as switch cards (as shown in the illustrated embodiment), then the number of high-speed data pins will be four. Therefore, high-speed data connection area 310A in particular is shown to comprise four high-speed data pins, 311A, 312A, 313A, 314A, among which pin 312A transports high-speed data from the mid-plane to commutator 320, pin 313A transports high-speed data from the mid-plane to commutator 320B, pin 313A transports data form commutator 3230A to the mid-plane and pin 314A transports high-speed data from commutator 330B to the mid-plane 110.

Connector 310 is matched with a corresponding one of the connectors 150A–150K on the switch side 110S of the mid-plane 110. In fact, each of the pins associated with connector 310 are aligned with respective pins in the corresponding connector on the switch side 110S of the mid-plane 110 and are provided with a complementary mating assembly. Thus, when switch card 300 is connected to the switch side 110S of the mid-plane, the high-speed data pins associated with each connection area 310A–310K electrically mate with the corresponding set of high-speed data pins in the corresponding connection areas 160 belonging to the corresponding switch-side connector, while the auxiliary pins from connector 310 electrically mate with the auxiliary pins belonging to the corresponding switch-side connector.

In order to ensure good electrical contact between a pair of connectors (connector 310 on the switch card 300 and a corresponding connector on the switch side 110S of the mid-plane 110), it is possible to rely on a frictional contact force. However, in the case where several hundred pins may be used, it is preferable to use known ZIF (zero insertion force) connectors which provide a mechanism, such as a cam, for applying a contact force after physical positioning of the card and, even more importantly, for removing the contact force prior to physical movement of the card.

Commutators 320A and 330A are identical N×N commutators with a CSR denoted $CSR_N$ and a CCR denoted $CCR_N$. Each functions by transferring the signal present at each of N inputs over to each of N outputs in a repetitive cyclical manner under control of a sequencing signal. However, there is a difference in the manner in which the commutators are interconnected. Specifically, commutator 330A should be connected inversely with respect to commutator 320A.

The sequencing signal driving the commutators arrives along a sequencing signal line 342 from a synchronization unit 341. The synchronization unit 341 comprises clock division circuitry for dividing a high-speed clock received from auxiliary pin 312T. Specifically, part of the clock division circuitry is used for producing the sequencing signal and another part of the clock division circuitry is used for producing a byte clock on a clock line 343. Auxiliary pin 312T is designed to mate with a complementary pin (on the switch side of the mid-plane) which is electrically connected to a respective one of the clock lines 1145 leading from the clock driver 1140 in the control processor card 400.

In order for N×N commutators 320A and 320B to cooperate with the other N×N commutators on other the switch cards and with the M×M commutators on the port cards so as to deliver the functionality of a P×P commutator, CSR of the N×N commutators should be harmonically related to the CSR of the M×M commutators. Thus, either of the following relationships should be obeyed:

(a) $CSR_M$ is a multiple of $CCR_N$; or
(b) $CSR_N$ is a multiple of $CCR_M$.

Between commutators 320A, 320B and 330A, 330B lies processing section 730. With reference to FIG. 7, processing section 730 is part of a massive time switch 750 that is distributed among all the switch cards 300A–300L. As will now be described with continued reference to FIG. 5, processing section 730 itself provides controllable time slot interchanging of the signals output by commutators 320A, 320B.

In the interest of simplicity, the remainder of the description of switch card 300 will mostly focus on that portion of the processing section 730 which processes signals output by commutator 320A. Those skilled in the art will find it straightforward to extend the described concepts to handling signals output by commutator 320B.

The outputs of commutator 320A are connected to respective serial-to-parallel interfaces 350A–350N, among which only interfaces 350A, 350B and 350N are shown. Each serial-to-parallel interface comprises circuitry for converting a serial bit stream into a parallel bit stream, preferably having a width of 8 bits (1 byte). The byte streams emanating from serial-to-parallel interfaces 350A–350N are fed in parallel to a bank of data memories 360A–360N, respectively.

Each data memory 360A–360N has four ports, namely an input port IN, an output port OUT, a read/not write port R/W and an address port AD. In the illustrated embodiment, the input port of each data memory 360A–360N is connected to the output of the respective serial-to-parallel interface 350A–350N and the output port of each of the data memories 360A–360N is connected to the input of a respective one of a plurality of parallel-to-serial interfaces 370A–370N. The read/not write port of each of the data memories 360A–360N is connected to a clock signal line 343 and the address port of each of the data memories 360A–360N is connected to a partial commutator 380.

Each of the data memories 360A–360N comprises an addressable (preferably byte-addressable) digital memory store having a total size of Y bytes broken down into P equally sized memory blocks of size Y/P, where P was defined previously as being equal to M*N. Preferably, the size of each block in the memory store is chosen such that one block becomes filled during one step of commutator 320A. Since the arrival rate of data on each commutator input is R Gbps, the number of bytes per block is equal to $Y/P=R*CSR_N$, from which it follows that $Y=R*CSR_N*P$.

Each of the data memories 360A–360N further comprises circuitry for writing bytes received at the input port IN to sequential memory locations in the memory store during a write cycle of the byte clock output by the synchronization unit 340 along clock line 343. Each of the data memories 360A–360N further comprises circuitry for reading from a memory location provided to the address port AD during a read cycle of the byte clock and outputting the contents of this memory location onto the output port OUT. Alternatively, each data memory can be read from sequentially but written to at an addresses provided at the address port AD.

To ensure that data is not overwritten while it is being read, a double buffering scheme may be used within the data memories 360A–360N, wherein one or more extra memory elements are used for storing data formerly belonging to a memory location which is currently being written to so that if the memory location in question needs to be read from, the former contents of that location are made available. Double buffering and/or shared parallel access to multiple memories can also be used to reduce the speed requirements on the memory array by trading speed for complexity.

The time slot interchanging property of processing section 730 arises from the ability to read data from each of the data memories 360A–360N in an order that is different from the order in which data is written. Assuming that there are no commutators at all in the entire OXC 100, N high-speed data signals data arriving from the various port cards via the connector 310 would be written to respective ones of the data memories 360A–360N in sequential order. Considering the entire OXC with reference to FIG. 7, there are P high-speed data signals arriving from the various port cards 200A–200K, each of which is written to a respective one of a plurality P of data memories distributed among the switch cards 300A–300L.

Now, by accessing the contents of each data memory in an order determined by a connection memory associated with that data memory, it is possible to achieve time switching of each individual signal. Still assuming that commutators are absent from the OXC 100, the number of connection memories would have to match the number of data memories. Thus, P connection memories are required in a commutation-less OXC 100.

However, the OXC does comprise commutators. More specifically, with reference to FIG. 7, there are two P×P commutators 740, 745 which are distributed among the port cards and the switch cards. The presence of commutators 740, 745 has two significant effects. Firstly, the cyclical transfer of each of the P commutator inputs to each of the P commutator outputs combines with the time slot interchanging functionality provided by the data memories to allow both time and space switching to be achieved.

That is to say, using both commutation and time slot interchanging, it is possible to read from a given data memory, say data memory 360Q, in such a way that not only allows reordering of the data from a inputs Q of commutator 740 but also retrieval of information from any of the P-1 other inputs. This is still done using a plurality of connection memories equal to the size of commutator 740.

However, another effect of the presence of commutators 740, 745 is that the data bytes which are written to each data memory belong to different commutator inputs and the rate of change is the CSR of P×P commutator 740. Therefore, in order for data memory Q to extract the data from a commutator input Q', it is necessary to apply a connection memory which varies in time at the commutation step rate of P×P commutator 740.

Alternatively, it is possible to provide a set of connection memories which define fixed connection maps but which are applied to different data memories. More specifically, the total of P connection memories can be connected through to the total of P data memories through a commutator programmed in software. Of course, since the data memories are divided into M sets of N data memories per set (one set for each of the commutators 320A–320M), it is feasible to use a partial commutator for each set of data memories, where the partial commutator has $1/M^{th}$ the number of outputs of a regular commutator.

Figure 8:
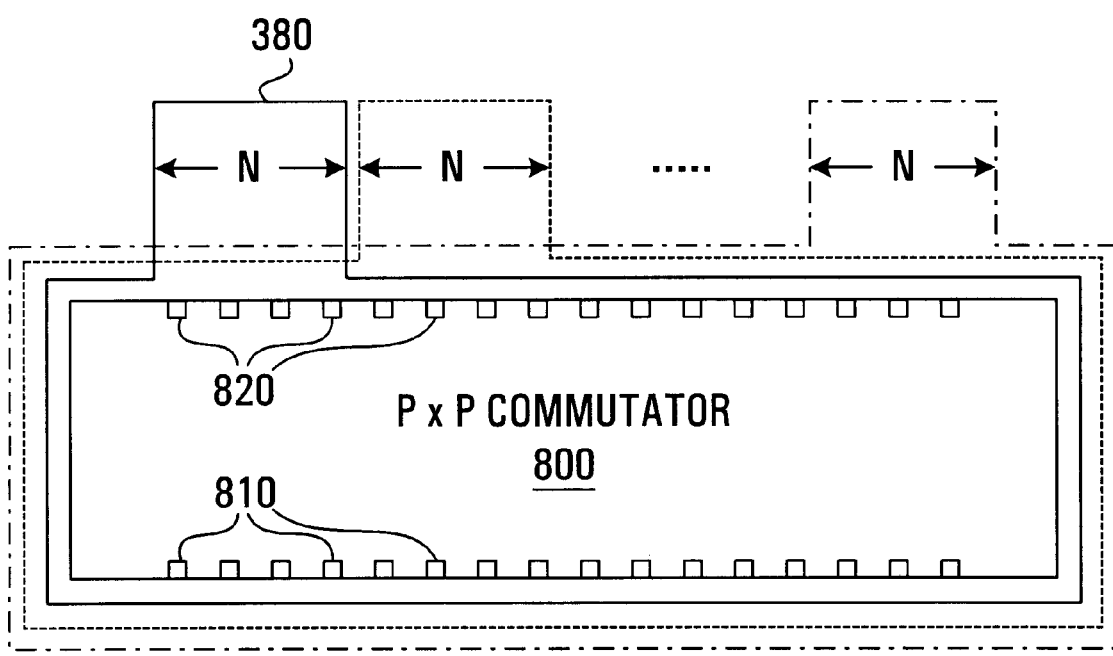
FIG. 8 shows how a partial P×N commutator can be constructed from a P×P commutator.

As shown in FIG. 8, a partial commutator 380 is a subset of a P×P commutator having the same CSR and CCR as P×P commutator 800, where P=M×N as defined previously.

Thus, with continued reference to FIG. 5, there is provided a set of P connection memories 390A–390P connected to a partial commutator 380, whose first N outputs 396A–396N are connected to the AD port of data memories 360A–360N, respectively. As for the set of data memories (not shown) associated with commutator 320B (shown in FIG. 7 but not shown in FIG. 5), their AD ports are connected to the next N output ports 395A–395N of partial commutator 380. Those skilled in the art will appreciate that the appropriate set of N outputs to be connected to the N data memories connected to a commutator depend on the position of that commutator in the switch card and on the position of that switch card in the OXC 100.

The connection memories 390 are populated with a connection map for each output of commutator 745 (i.e., for each output high-speed data signal at R Gbps) as a function of the inputs to commutator 740. The same set of connection maps is used in each of the switch cards 300A–300L. The connection memories 390A–390P are updated by a control signal 344 received from a control unit 340. The control unit processes external commands to change the mapping of certain connection memories as different connections are required through the OXC 100. These commands are received from the central processor 1110 in the processor control card 400 via bus 1160, wiring the mid-plane 110, pin 312C and a signal line 345.

Thus, each of the data memories 360A–360N is read as a function of the connection memories 390A–390P and the state of partial commutator 380. This results in each data memory performing a time-slot interchange of the data received at its IN port. The extracted data is then forwarded to a respective one of a plurality of parallel-to-serial interfaces 370A–370N. Each of the parallel-to-serial interfaces 370A–370P comprises circuitry for converting incoming bytes into a single bit stream which is fed to commutator 330A. As previously discussed, commutator 330 is identical to commutator 320 (but connected backwards, from a sequencing perspective) and operates at the same CSR and at the same CCR.

Although not illustrated in FIG. 5, it should be understood that processing section 730 comprises a similar setup for processing signals output by commutator 320B (not shown in FIG. 5 but shown in FIG. 7). Specifically, there will be provided a replicated pair of commutators, a replicated bank of data memories and interfaces. The control unit 340 can be shared, as can the connection memories 390 and the partial commutator 380 if partial commutator 380 is expanded to provide a second set of sixteen output ports.

In operation, compound commutator 740 performs chopping of the totality of P input signals into small portions, and each portion reaches a data memory on one of the switch cards. The data memory reached by each portion varies cyclically at a rate equal to the CSR of commutator 740. Thus, each data memory is populated with portions of data from each of the P input signals.

In accordance with a connection memory that also changes cyclically, each data memory then performs time-slot interchanging of the portions themselves (for coarse granularity switching) or time-slot interchanging of even smaller sub-portions of each portion (for finer granularity switching). Each data memory may perform grooming of the data portions or sub-portions prior to (or after) time slot interchanging.

Commutator 745 then reconstructs signals read by the various data memories by concatenating the (possibly timeslot interchanged) portions in a known order.

Clearly, if the data memories perform time-slot interchanging of sub-portions of data but do not perform time-slot interchanging of the portions themselves, then the only type of switching that will be achieved by OXC 100 is non-blocking time-switching.

On the other hand, if the data memories interchange entire data portions corresponding to different input signals, then pure non-blocking space switching will be achieved by virtue of the combined effect of commutators 740 and 745. It follows that non-blocking time and space switching will be achieved by a combination of interchanging portions of data corresponding to different input signals as well as smaller sub-portions within each portion.

In addition to providing non-blocking time and space switching for a very large number P of input signals, the present invention allows such switching to be achieved in an efficient and economical way by distributing commutators 740 and 745 among the port cards and switch cards, by distributing a time slot interchanging functionality among the switch cards, and by placing the port cards in a special physical relationship with the switch cards. This leads to significant savings in terms of manufacturing costs, shelf space, propagation delays through wiring, power consumption et cetera.

One possible way of choosing the commutation step rate for commutator 740 (denoted $CSR_P$ and equal to the faster of $CSR_M$ and $CSR_N$) is now described. Firstly, it is to be appreciated that $CSR_P$ will follow from the requirements of the OXC as a function of the rate of signals passing through the OXC and on the desired bandwidth granularity. Bandwidth granularity refers to the bit rate of the lowest-level signal that can be switched by the OXC 100. For example, the bandwidth granularity of an STS-1 signal is 51.84 Mbps and the bandwidth granularity of an STS-3 signal is 155.52 Mbps.

Now, a given bandwidth granularity can be achieved if each of the data memories 360A–360N in a given switch card (say generic switch card 300 in FIG. 5) has just enough memory to store one data element between steps of commutator 740. Thus, the bandwidth granularity will be related to the size (in bits) of each data element and the CSR of commutator 740 (denoted $CSR_P$).

Specifically, with R being the rate of incoming signals and assuming that each data element is B bits wide, the bandwidth granularity (denoted BG) will be equal to $BG=CSR_P/B$. This level of granularity corresponds to one byte transferred from input to output for each step of commutator 740. For a desired value of the bandwidth granularity, it is therefore a simple exercise to calculate the required commutation step rate $CSR_P$ of commutator 740, which automatically determines $CSR_M$ and $CSR_N$.

In the preferred embodiment of the generic switch card 300, the signals arriving at each of the data memories 360A–360N from the serial-to-parallel interfaces 350A–350N have a data rate of R Gbps, which could be equal to 10 Gbps or more. With an 8-bit bus this requires that the memory store in each data memory to function at a speed of 1.25 GHz or more. If sufficiently fast memories are not available, then an array of lower-speed memories may be substituted. For example, an array of 16 memories, each 4096 bytes deep and operating at 311 MHz act as one 16-kibibyte memory at 1.25 GHz.

Of course, those skilled in the art will appreciate that the invention can be applied to switching optical multi-wavelength signals rather than single-wavelength optical signals. To this end, there may be provided a wavelength demultiplexer device within the optical transmit circuit 270 and/or a wavelength multiplexing device within the optical receive circuit 280 of each port card 200.

Moreover, it is to be understood that the switch of the present invention may be used to provide purely electrical switching without the need for opto-electronic conversion.

According to still another embodiment of the present invention, additional capacity may be added by inserting a greater number of port cards and switch cards. The additional capacity may be used on a regular basis or only when one of the port cards or switch cards undergoes maintenance or suffers a failure. Also, additional cards or circuit packs can be added to provide control functionality, although these extra control modules need not be placed in parallel with either the port cards or the switch cards.

If additional cards are used as a protection facility, then certain modifications must be made to the design of the OXC 100 so that recovery may be had from failures. For example, let it be the case that one spare port card and one spare switch card are provided. This allows full protection in case of one failed switch card and/or one failed port card.

Considering port card 200 in FIG. 2., in order to implement the protection scheme, each output of the M×M commutator 230 can be passed through a 1×2 multiplexer which selects whether the output is going to the usual switch card o to the spare switch card. Alternatively, the M×M commutator can be replaced by an M×(M+1) commutator which operates like an M×M commutator under normal circumstances, but which has the ability to apply a controllable regulation of the various CSRs in the case of a switch card failure.

Thus, from the point of view of commutator 230, while the normal sequence of outputs for input 1 of, say 16, may be 1, 2, 3, 4, 5, 6, 7, 8, 9, 10, 11, 12, 13, 14, 15, 16 and if there are 8 switch cards and switch card 3 of 8 fails, then the sequence of outputs would have to be reprogrammed to be 1, 2, 3, 4, 17, 18, 7, 8, 9, 10, 11, 12, 13, 14, 15, 16. In this case, 17 and 18 represent the outputs going to the $9^{th}$ (spare) switch card.

A similar reprogramming would have to occur on commutator 230B. Such reprogramming could be achieved by the central processor 1110 in the control processor card 400 via the control bus 290.

Similarly, the switch cards may have to respond to a port card failure. Also in a similar fashion, the commutators on the switch card would have to be reprogrammed to jump to the spare port card in order to exchange signals therewith. However, it is exactly these I/O functions of the spare port card which slightly complicate the protection scheme in the case of a failed port card. Specifically, if a port card fails, then the switch cards completely lose visibility of the signals formerly coming into the OXC on the external input optical fibers corresponding to the failed card.

Figure 12:
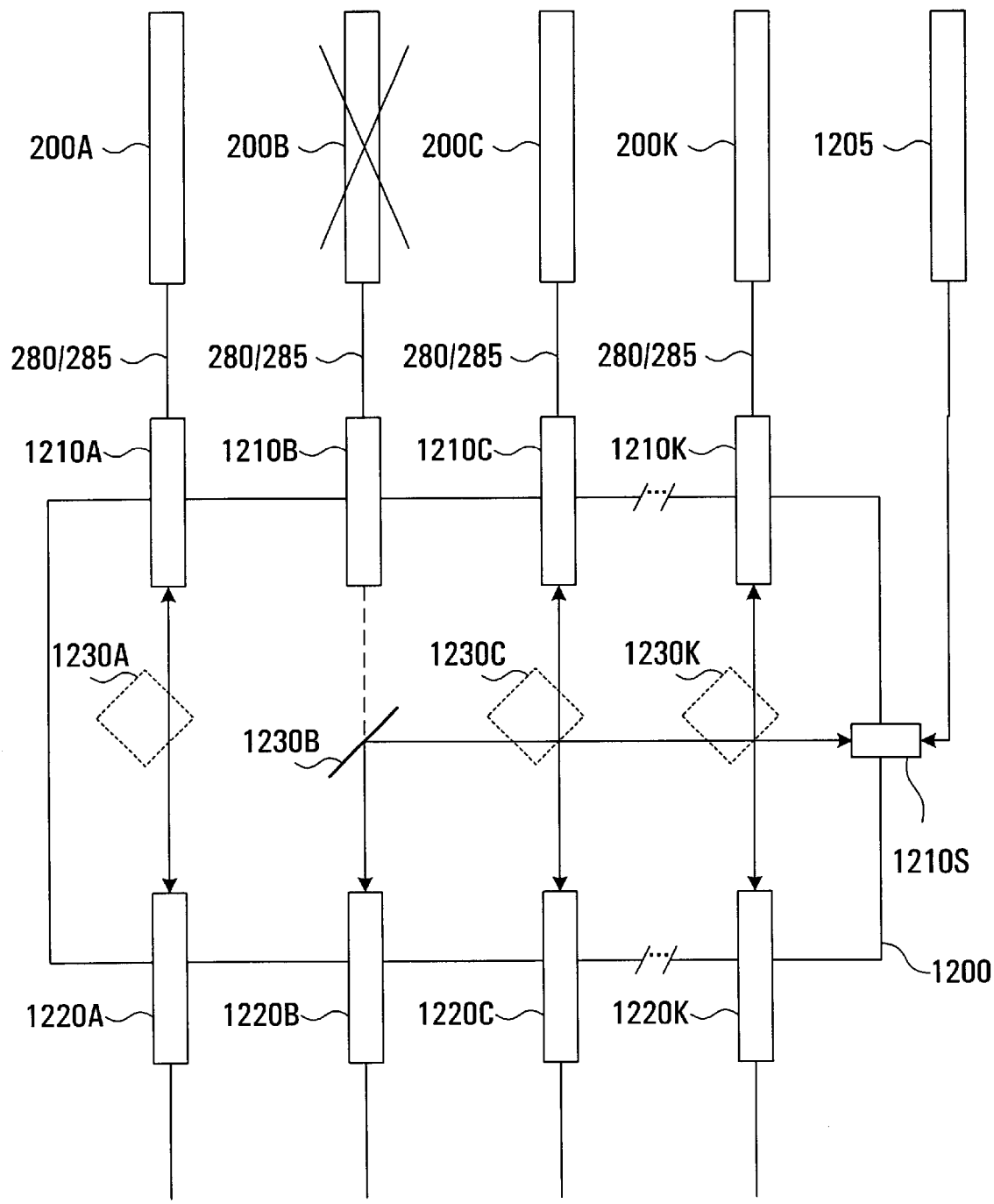
FIG. 12 shows a micro-electro-mechanical device for protecting traffic going to and coming from a failed port card.

Thus, in addition to re-programming the commutators in the switch card, it is necessary to re-route the external optical signals from the external source to the spare port card and back again. With reference now to FIG. 12, there is shown a mechanism for providing this rerouting functionality. Specifically, a known micro-electro-mechanical (MEM) switch device 1200 can be used for this purpose.

With reference to FIG. 12, therefore, the MEM switch device 1200 comprises a set of bidirectional connectors 1210A–1210K leading to and from respective port cards 200A–200K along respective external input and output optical fibers 280/285. MEM Device 1200 also comprises a set of bidirectional connectors 1220A–1220K leading to central office equipment via respective fibers 1220A–1220K. Within the MEM device, under no-fault conditions, light is routed straight through between connectors 1210A–1210K and 1220A–1220K, respectively.

Furthermore, MEM device 1200 comprises a plurality of mirrors 1230A–1230K which are constructed such that they do not intercept the optical path between optical connectors under no fault conditions, but which can be electrically controlled to stand up if a port card fault is detected. In addition, MEM device 1200 comprises a bidirectional connector 1210S connected to a spare port card 1205. Bidirectional connector 1210S is connected in parallel with the mirrors 1230A–1230K and perpendicularly to the straight-through optical paths between connectors 1210A–1210K and 1220A–1220K.

In the illustrated example, port card 200B is assumed to cause a fault condition. Thus, mirror 1230B is caused to "stand up" and therefore divert light from connector 1220B to connector 1210S and vice versa. In this way, traffic flowing though connector 1220B is protected.

It is also to be understood that the switch cards of the present invention may provide functionality other than time slot interchanging, such as signal grooming. For example, data which is stored in the data memories 360A–360N of switch card 300 may be altered by a processor. Modifications to the data may include changing the format of the data or changing the contents of frame overhead.

Figure 13:
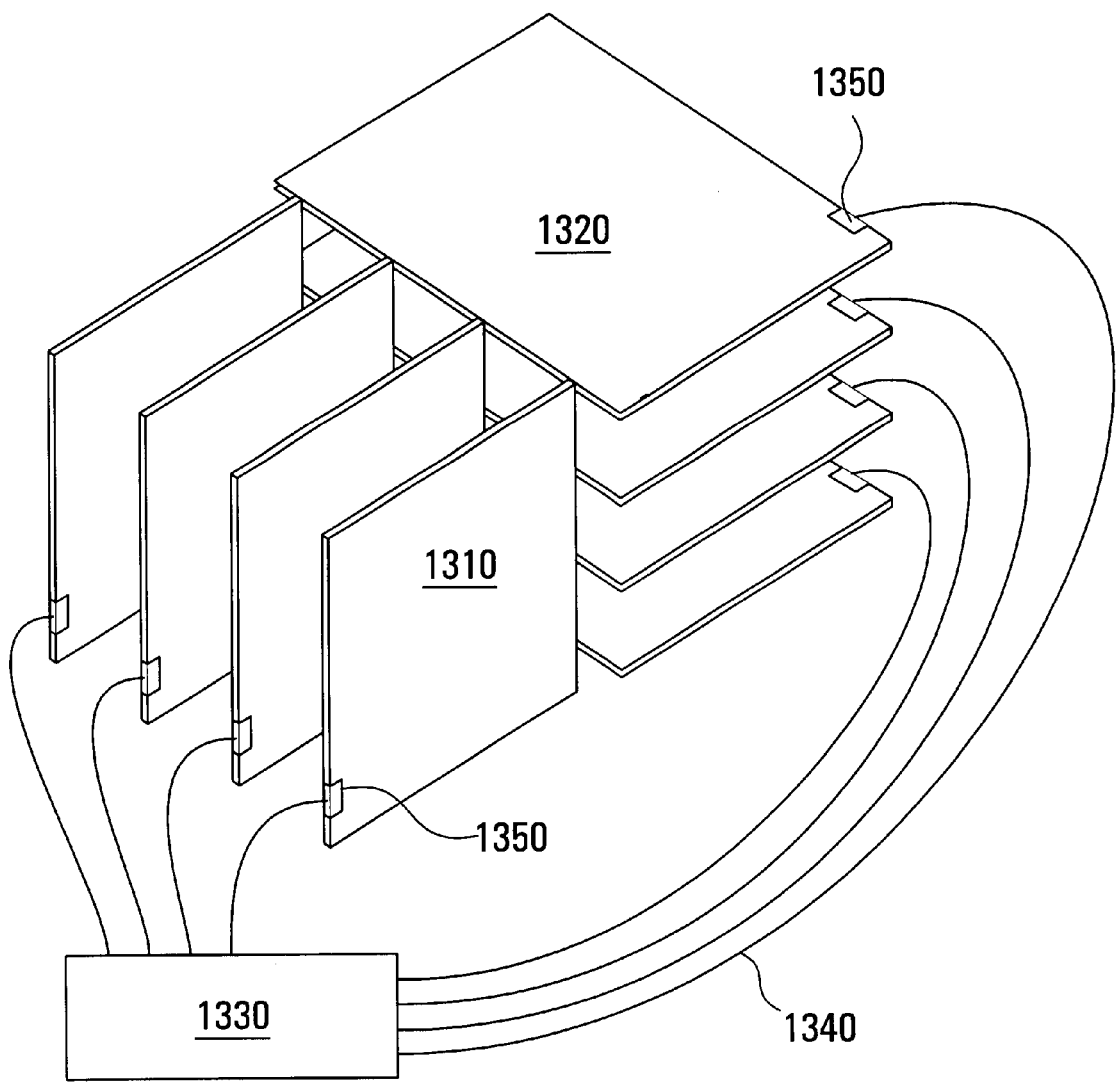
FIG. 13 is a perspective view of a high-capacity optical cross-connect including a sets of parallel port cards connected to a set of parallel switch cards without the intermediary of a mid-plane.

Moreover, it is within the scope of the invention to omit the mid-plane in its entirety. In this case, high-speed data connections would be established between complementarily mating pins on the port cards and the switch cards, but control functionality would be provided independently via pins connected to the opposite end each card. In FIG. 13 is shown an example of an OXC in accordance with this alternate embodiment of the invention, wherein each of a plurality of port cards 1310 is connected to each of a plurality of switch cards 1320 without the intermediary of a mid-plane. Auxiliary functions such as power, grounding, timing and control are provided by a control unit 1330 via control lines 1340 leading to special connectors 1350 on the port cards 1310 and on the switch cards 1320.

While the preferred embodiment of the present invention has been described and illustrated, those skilled in the art will appreciate that still other variations and modification are possible without departing from the scope of the invention as defined in the appended claims.

We claim:

1. A switching unit, comprising:

a plurality of port cards, each port card comprising at least one first M-way commutator and a corresponding number of second M-way commutators, wherein the first M-way commutators over all the port cards range from a $1^{st}$ first M-way commutator to an Nth first M-way commutator and wherein the second M-way commutators over all the port cards range from a $1^{st}$ second M-way commutator to an Nth second M-way commutator; and a plurality of switch cards, each switch card comprising at least one first N-way commutator and a corresponding number of second N-way commutators, wherein the first N-way commutators over all the switch cards range from a $1^{st}$ first N-way commutator to an Mth first N-way commutator and wherein the second N-way commutators over all the switch cards range from a $1^{st}$ second N-way commutator to an Mth second N-way commutator, each switch card further comprising a time switch for controllably interchanging portions of signals present at the outputs of the at least one first N-way commutator on that switch card, and for providing switched signals to the inputs of the at least one second N-way commutator on that switch card;

wherein the mth output of the nth first M-way commutator is connected to the nth input of the mth first N-way commutator and wherein the nth output of the mth second N-way commutator is connected to the mth input of the nth second M-way commutator, for 1<=m<=M and 1<=n<=N.

2. A switching unit as claimed in claim 1, wherein the M-way commutators and the N-way commutators have harmonically related commutation step rates, whereby the first M-way commutators on the port cards and the first N-way commutators on the switch cards work as a P-way commutator and whereby the second M-way commutators on the port cards and the second N-way commutators on the switch cards work as a P-way commutator, where P=M*N.

3. A switching unit as claimed in claim 1, wherein the port cards are substantially parallel to one another, wherein the switch cards are substantially parallel to one another and wherein a normal to any port card and a normal to any switch card are not parallel.

4. A switching unit as claimed in claim 1, wherein the port cards are substantially parallel to one another, wherein the switch cards are substantially parallel to one another and wherein the port cards are substantially orthogonal to the switch cards.

5. A switching unit as claimed in claim 1, wherein all the commutators and the time switches in each switch card cooperate to provide non-blocking time and space switching of signals at the inputs of the first M-way commutators.

6. A switching unit as claimed in claim 1, further comprising a mid-plane connected to the port cards and to the switch cards, wherein connections between the first M-way commutators and the first N-way commutators and connections between the second N-way commutators and the second M-way commutators are provided by electrical paths through the mid-plane.

7. A switching unit as claimed in claim 1, further comprising a control unit connected to the port cards and to the switch card, wherein the control unit is adapted to provide synchronization of the commutators on the port cards and on the switch cards.

8. A switching unit as claimed in claim 6, further comprising a control unit connected to the port cards and to the switch card, wherein the control unit is adapted to provide synchronization of the commutators on the port cards and on the switch cards.

9. A switching unit as claimed in claim 8, wherein the control unit is connected to the port cards and to the switch cards through respective electrical traces through the mid-plane.

10. A switching unit as claimed in claim 1, wherein the each port card further comprises a receive processing section connected to the input of the respective first M-way commutator and a transmit processing section connected to the output of the respective second M-way commutator.

11. A switching unit as claimed in claim 10, wherein the receive processing section comprises opto-electronic conversion circuitry, for converting a plurality of optical signals into M electrical signals fed to respective inputs of the respective first M-way commutator.

12. A switching unit as claimed in claim 11, wherein the receive processing section further comprises a processing and conditioning unit connected between the opto-electronic conversion circuitry and the respective first M-way commutator, comprising circuitry for decoding control information contained in the frames of incoming signals.

13. A switching unit as claimed in claim 10, wherein the transmit processing section comprises opto-electronic conversion circuitry, for converting a plurality of signals received from the second M-way commutator into a plurality of optical signals.

14. A switching unit as claimed in claim 13, wherein the transmit processing section further comprises a processing and conditioning unit connected between the respective second M-way commutator and the opto-electronic conversion circuitry, comprising circuitry for encoding control information into the frames of outgoing signals.

15. A switching unit as claimed in claim 12, wherein at least one of the processing and conditioning units further comprises circuitry for extracting a clock signal from incoming signals.

16. A switching unit as claimed in claim 1, wherein the time switch on each switch card comprises a plurality N of data memories and a plurality N of connection memories, wherein each data memory comprises an addressable memory store adapted to write data received from the first N-way commutator into a sequential memory locations and further adapted to read data at a memory location specifiable by the connection memory and further adapted to supply the read data to the second N-way commutator.

17. A switching unit as claimed in claim 16, wherein the M-way commutators have a first commutation step rate and the N-way commutators have a second commutation step rate harmonically related to the first commutation step rate, each switch card further comprising means connected to the connection memories, for changing the connection memories at a rate equal to the faster of the first and second commutation step rates.

18. A switching unit as claimed in claim 1, each switch card further comprising a serial-to-parallel interface between the respective first N-way commutator and the respective time switch and a parallel-to-serial interface between the respective time switch and the respective second N-way commutator.

19. A switching unit as claimed in claim 1, further comprising at least one spare card identical in structure to, and connected in parallel with, the port cards, for providing the functionality of a port card in case of failure of a port card.

20. A switching unit as claimed in claim 19, wherein upon failure of a port card, the first N-way commutator on each switch card is programmable to receive data from one of the spare cards instead of the failed port card.

21. A switching unit as claimed in claim 19, wherein upon failure of a port card, the second N-way commutator on each switch card is programmable to send data to one of the spare cards instead of the failed port card.

22. A switching unit as claimed in claim 19, further comprising a micro-electro-mechanical switch for rerouting external traffic to and from one of the spare cards in case of a port card failure.

23. A switching unit as claimed in claim 1, further comprising at least one spare card identical in structure to, and connected in parallel with, the switch cards, for providing the functionality of a switch card in case of failure of a switch card.

24. A switching unit as claimed in claim 23, wherein upon failure of a switch card, the first M-way commutator on each port card is programmable to send data to one of the spare cards instead of the failed switch card.

25. A switching unit as claimed in claim 23, wherein upon failure of a switch card, the second M-way commutator on each port card is programmable to receive data from one of the spare cards instead of the failed switch card.

26. A switching unit, comprising:
a plurality of receive port cards, each receive port card comprising at least one first M-way commutator, wherein the first M-way commutators over all the receive port cards range from a $1^{st}$ first M-way commutator to an Nth first M-way commutator;
a plurality of transmit port cards, each transmit port card comprising at least one second M-way commutator, wherein the second M-way commutators over all the transmit port cards range from a $1^{st}$ second M-way commutator to an Nth second M-way commutator;
a plurality of switch cards, each switch card comprising at least one first N-way commutator and a corresponding number of second N-way commutators, wherein the first N-way commutators over all the switch cards range from a $1^{st}$ first N-way commutator to an Mth first N-way commutator and wherein the second N-way commutators over all the switch cards range from a $1^{st}$ second N-way commutator to an Mth second N-way commutator, each switch card further comprising a time switch for controllably interchanging portions of signals present at the outputs of the at least one first N-way commutator on that switch card, and for providing switched signals to the inputs of the at least one second N-way commutator on that switch card;

wherein the mth output of the nth first M-way commutator is connected to the nth input of the mth first N-way commutator and wherein the nth output of the mth second N-way commutator is connected to the mth input of the nth second M-way commutator, for 1<=m<=M and 1<=n<=N.

27. A switching unit as claimed in claim 26, wherein the M-way commutators and the N-way commutators have harmonically related commutation step rates, whereby the first M-way commutators on the receive port cards and the first N-way commutators on the switch cards work as a P-way commutator and whereby the second M-way commutators on the transmit port cards and the second N-way commutators on the switch cards work as a P-way commutator, where P=M*N.

28. A switching unit as claimed in claim 26, wherein the receive port cards are substantially parallel to one another, wherein the transmit port cards are substantially parallel to one another, wherein the switch cards are substantially parallel to one another, wherein the normal to any receive port card and the normal to any switch card are not parallel and wherein the normal to any transmit port card and the normal to any switch card are not parallel.

29. A switching unit as claimed in claim 26, wherein the receive port cards are substantially parallel to one another, wherein the transmit port cards are substantially parallel to one another, wherein the switch cards are substantially parallel to one another and wherein the receive port cards are substantially orthogonal to the switch cards and wherein the transmit port cards are substantially orthogonal to the switch cards.

30. A switching unit as claimed in claim 26, wherein all the commutators and the means for controllably time switching cooperate to provide non-blocking time and space switching of signals at the inputs of the first M-way commutators.

31. A switching unit as claimed in claim 26, further comprising a first mid-plane connected to the receive port cards and to the switch cards and a second mid-plane connected to the transmit port cards and to the switch cards, wherein the connections between the first M-way commutators and the first N-way commutators are provided by electrical paths through the first mid-plane and the connections between the second N-way commutators and the second M-way commutators are provided by electrical paths through the second mid-plane.

32. A port card, comprising:
a connector for connecting the port card to a plurality of switch cards;
at least one first M-way commutator and a corresponding number of second M-way commutators, the connector being connected to the outputs of the at least one first M-way commutator and to the inputs of the second M-way commutators, the first and second M-way commutators having a common commutation step rate controllable by a sequencing signal; and
a sequencing unit connected to the connector and to the first and second M-way commutators, for generating the sequencing signal as a function of a clock signal received from the connector.

33. A circuit card, comprising:
a connector distributed along an edge of the circuit card;
a first commutator having a plurality of outputs connected to the connector;
a second commutator having a plurality of inputs connected to the connector;
wherein the first and second commutators cooperate with a plurality of other commutators and a distributed time switch to provide non-blocking time and space switching of signals at the inputs to the first commutator.

34. A switch card, comprising:
a connector for connecting the switch card to a plurality of port cards;
at least one first commutator and a corresponding number of second commutators, the connector being connected to the inputs of the at least one first commutator and to the outputs of the second commutators, the first and second commutators having a common commutation step rate controllable by a sequencing signal;
means for controllably time switching a plurality of signals output by each first commutator and for providing a plurality of switched signals to the corresponding second commutator; and
a sequencing unit connected to the connector and to the first and second commutators, for generating the sequencing signal as a function of a clock signal received from the connector.

35. A circuit card, comprising:
a connector disposed along an edge of the circuit card;
a first commutator having a plurality of inputs connected to the connector;
a second commutator having a plurality of outputs connected to the connector;
a time switch comprising a plurality of randomly addressable data memories connected between respective outputs of the first commutator and respective inputs of the second commutator;
wherein the randomly addressable data memories are accessed according to a time-varying connection map;
whereby the time switch cooperates with other time switches and the first and second commutators cooperate with other commutators to provide non-blocking time and space switching of a plurality of input signals.

36. A compound commutator, comprising:
a plurality of M-way commutators distributed among a plurality of substantially parallel first circuit cards, wherein the M-way commutators over all the first circuit cards range from a $1^{st}$ M-way commutator to an Nth M-way commutator, and wherein the M-way commutators have a common first commutation step rate; and
a plurality of N-way commutators distributed among a plurality of substantially parallel second circuit cards, wherein the N-way commutators over all the second circuit cards range from a $1^{st}$ N-way commutator to an Mth N-way commutator, and wherein the N-way commutators have a common second commutation step rate;
wherein the mth output of the nth M-way commutator is connected to the nth input of the mth N-way commutator for all 1<=m<=M and 1<=n<=N;
wherein the first and second commutation step rates are harmonically related; and
wherein a normal to any first circuit card and a normal to any second circuit card are not parallel.

37. A compound commutator as claimed in claim 36, wherein the plurality of second circuit cards are disposed obliquely with respect to the first circuit cards.

38. A compound commutator as claimed in claim 36, wherein the plurality of second circuit cards are disposed substantially orthogonally with respect to the first circuit cards.

39. A compound commutator as claimed in claim 36, wherein the first commutation step rate is equal to M times the second commutation step rate.

40. A compound commutator as claimed in claim 39, wherein the compound commutator has a commutation step rate equal to the first commutation step rate.

41. A compound commutator as claimed in claim 36, wherein the second commutation step rate is equal to N times the first commutation step rate.

42. A compound commutator as claimed in claim 41, wherein the compound commutator has a commutation step rate equal to the second commutation step rate.

43. A compound commutator as claimed in claim 36, wherein any of the first commutators is itself an M-way compound commutator.

44. A compound commutator as claimed in claim 36, wherein any of the second commutators is itself an N-way compound commutator.

* * * * *